(12) United States Patent
Kurasawa et al.

(10) Patent No.: US 10,437,367 B2
(45) Date of Patent: Oct. 8, 2019

(54) DISPLAY APPARATUS

(71) Applicant: Japan Display Inc., Tokyo (JP)

(72) Inventors: Hayato Kurasawa, Tokyo (JP); Shinichiro Oka, Tokyo (JP); Toshinori Uehara, Tokyo (JP); Hiroshi Mizuhashi, Tokyo (JP); Yoshitoshi Kida, Tokyo (JP)

(73) Assignee: Japan Display Inc., Tokyo (JP)

( * ) Notice: Subject to any disclaimer, the term of this patent is extended or adjusted under 35 U.S.C. 154(b) by 78 days.

(21) Appl. No.: 15/794,445

(22) Filed: Oct. 26, 2017

(65) Prior Publication Data

US 2018/0120993 A1 May 3, 2018

(30) Foreign Application Priority Data

Oct. 28, 2016 (JP) ................. 2016-212182

(51) Int. Cl.
| | |
|---|---|
| *G06F 3/041* | (2006.01) |
| *G02F 1/1343* | (2006.01) |
| *G02F 1/1362* | (2006.01) |
| *G06F 3/044* | (2006.01) |
| *G06K 9/00* | (2006.01) |
| *G06K 9/20* | (2006.01) |
| *G02F 1/1333* | (2006.01) |

(52) U.S. Cl.
CPC ...... *G06F 3/0412* (2013.01); *G02F 1/134336* (2013.01); *G02F 1/136286* (2013.01); *G06F 3/044* (2013.01); *G06F 3/0416* (2013.01); *G06K 9/0002* (2013.01); *G06K 9/209* (2013.01); *G02F 1/13338* (2013.01); *G02F 1/134363* (2013.01); *G02F 2001/13629* (2013.01); *G02F 2001/134372* (2013.01); *G06F 2203/04107* (2013.01); *G06F 2203/04108* (2013.01)

(58) Field of Classification Search
CPC ...... G06F 3/0412; G06F 3/044; G06F 3/0416; G06F 2203/04107; G06F 3/041–3/048; G09G 3/3655
See application file for complete search history.

(56) References Cited

U.S. PATENT DOCUMENTS

| | | | |
|---|---|---|---|
| 9,983,750 B2 * | 5/2018 | Lee ...................... | G06F 3/044 |
| 10,146,389 B2 * | 12/2018 | Kida ................... | G06F 3/0418 |
| 2011/0157504 A1 | 6/2011 | Kimura et al. | |

(Continued)

FOREIGN PATENT DOCUMENTS

JP 2011-137882 A 7/2011

*Primary Examiner* — Sanjiv D. Patel
(74) *Attorney, Agent, or Firm* — K&L Gates LLP

(57) ABSTRACT

A display apparatus includes a basement, a display functional layer, a first electrode, a guard electrode, and a detection controller. The basement has a first surface and a second surface opposite to the first surface. The display functional layer is arranged on the side of the second surface of the basement. The first electrode is arranged between the basement and the display functional layer and detects an object in contact with or in proximity to the first surface. The guard electrode is arranged between the first electrode and the basement and supplied with a guard signal. The guard signal suppresses a change in capacitance generated between the first electrode and the guard electrode. The detection controller is a controller to which a signal based on a change in capacitance of the first electrode is output from the first electrode.

17 Claims, 25 Drawing Sheets

(56) References Cited

U.S. PATENT DOCUMENTS

| | | | |
|---|---|---|---|
| 2013/0088448 A1* | 4/2013 | Seo | G06F 3/0488 |
| | | | 345/173 |
| 2014/0152613 A1* | 6/2014 | Ishizaki | G06F 3/0412 |
| | | | 345/174 |
| 2014/0184944 A1* | 7/2014 | Ma | G02F 1/134363 |
| | | | 349/12 |
| 2016/0187694 A1* | 6/2016 | Kim | G06F 3/0412 |
| | | | 349/12 |
| 2017/0090643 A1* | 3/2017 | Kim | G06F 3/0412 |
| 2017/0090673 A1* | 3/2017 | Kim | G06F 3/0418 |
| 2017/0205953 A1* | 7/2017 | Sun | G09G 3/3648 |
| 2017/0220182 A1* | 8/2017 | Schwartz | G06F 3/0416 |
| 2018/0143711 A1* | 5/2018 | Ono | G06F 3/044 |

* cited by examiner

DISPLAY APPARATUS

CROSS-REFERENCE TO RELATED APPLICATIONS

This application claims priority from Japanese Application No. 2016-212182, filed on Oct. 28, 2016, the contents of which are incorporated by reference herein in its entirety.

BACKGROUND

1. Technical Field

The present disclosure relates to a display apparatus.

2. Description of the Related Art

Detection apparatuses capable of detecting an external proximate object, what are called touch panels, have recently been attracting attention. Touch panels are mounted on or integrated with a display apparatus, such as a liquid crystal display apparatus, and used as display apparatuses. The liquid crystal display panel disclosed in Japanese Patent Application Laid-open Publication No. 2011-137882 (JP-A-2011-137882) can detect an object in contact with or in proximity to a detection surface based on a change in capacitance between capacitance lines and source wires in the liquid crystal display panel.

The liquid crystal display panel disclosed in JP-A-2011-137882 includes a liquid crystal layer that displays an image between the wiring of the capacitance lines and the detection surface and between the source wires and the detection surface. With this configuration, capacitance between the capacitance lines and the source wires may possibly change because of a change in the permittivity of the liquid crystal layer. As a result, it may possibly be difficult to improve the detection performance.

SUMMARY

A display apparatus according to one aspect includes a basement having a first surface and a second surface opposite to the first surface, a display functional layer arranged on a side of the second surface of the basement, a first electrode that is arranged between the basement and the display functional layer and detects an object in contact with or in proximity to the first surface, a guard electrode arranged between the first electrode and the basement and supplied with a guard signal, the guard signal suppressing a change in capacitance generated between the first electrode and the guard electrode, and a detection controller to which a signal based on a change in capacitance of the first electrode is output from the first electrode.

A display apparatus according to one aspect includes a basement having a first surface and a second surface opposite to the first surface, a display functional layer arranged on a side of the second surface of the basement, a first electrode arranged between the basement and the display functional layer, a second electrode facing the first electrode, a switching element provided in correspondence with the second electrode, and arranged between the first electrode and the basement, a detection electrode that is arranged between the first electrode and the basement and outputs a detection signal based on a change in capacitance generated between the first electrode and the detection electrode, and a detection controller to which the signal based on the change in the capacitance between the first electrode and the detection electrode is output from the detection electrode.

DETAILED DESCRIPTION

Figure 1:
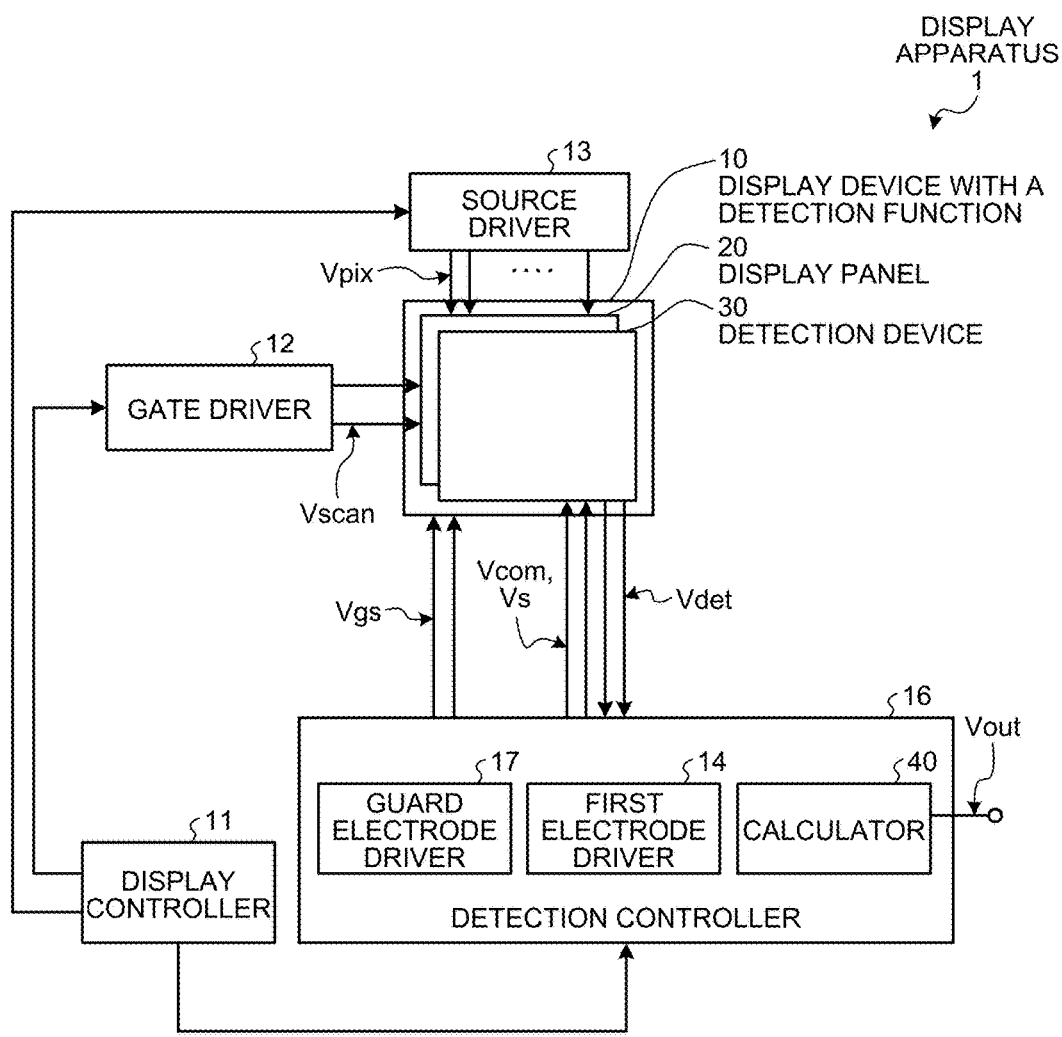
FIG. 1 is a block diagram of an exemplary configuration of a display apparatus according to a first embodiment of the present invention.

Exemplary aspects (embodiments) to embody the present invention are described below in greater detail with reference to the accompanying drawings. The contents described in the embodiments are not intended to limit the present invention. Components described below include components easily conceivable by those skilled in the art and components substantially identical therewith. Furthermore, the components described below can be appropriately combined. The disclosure is given by way of example only, and appropriate modifications made without departing from the spirit of the invention and easily conceivable by those skilled in the art naturally fall within the scope of the invention. To simplify the explanation, the drawings may possibly illustrate the width, the thickness, the shape, and other elements of each unit more schematically than the actual aspect. These elements, however, are given by way of example only and are not intended to limit interpretation of the invention. In the specification and the figures, components similar to those previously described with reference to previous figures are denoted by like reference numerals, and overlapping explanation thereof will be appropriately omitted.

First Embodiment

FIG. 1 is a block diagram of an exemplary configuration of a display apparatus according to a first embodiment of the present invention. As illustrated in FIG. 1, a display apparatus 1 includes a display device with a detection function 10, a display controller 11, a gate driver 12, a source driver 13, and a detection controller 16. In the display apparatus 1, the display device with a detection function 10 has a detection function.

The display device with a detection function 10 is an apparatus in which a display panel 20 is integrated with a detection device 30. The display panel 20 includes liquid crystal display elements. The detection device 30 is a detection apparatus that detects touch input. The apparatus in which the display panel 20 is integrated with the detection device 30 indicates an apparatus in which part of substrates and electrodes are shared by the display panel 20 and the detection device 30, for example. The display panel 20 may be an organic electroluminescence (EL) display panel, for example.

The display panel 20 is an element that sequentially scans one horizontal line based on scanning signals Vscan supplied from the gate driver 12, thereby performing display.

The display controller 11 is a circuit that supplies control signals to the gate driver 12 and the source driver 13 based on video signals supplied from the outside, thereby mainly controlling a display operation. The display controller 11 also supplies control signals to the detection controller 16, thereby performing control such that the gate driver 12, the source driver 13, and the detection controller 16 operate synchronously or asynchronously with one another.

The gate driver 12 has a function to sequentially select one horizontal line to be a target of display drive in the display device with a detection function 10 based on the control signals supplied from the display controller 11.

The source driver 13 is a circuit that supplies pixel signals Vpix to respective sub-pixels SPix of the display device with a detection function 10 based on the control signals supplied from the display controller 11. The display controller 11 may generate the pixel signals Vpix and supply those to the source driver 13.

The detection device 30 performs a touch detection operation based on the basic principle of capacitance touch detection to detect contact or proximity of an external object. If the detection device 30 detects contact or proximity of an external object, the detection device 30 outputs detection signals Vdet to the detection controller 16.

The detection controller 16 includes a first electrode driver 14, a guard electrode driver 17, and a calculator 40. The detection controller 16 is a circuit that controls a detection operation of detecting an external object in contact with or in proximity to the detection device 30. The first electrode driver 14 is a circuit that supplies detection drive signals Vs or display drive signals Vcom to first electrodes 25 of the display device with a detection function 10 based on the control signals supplied from the display controller 11.

The guard electrode driver 17 is a circuit that generates guard signals Vgs and supplies those to guard electrodes of the detection device 30.

Figure 5:
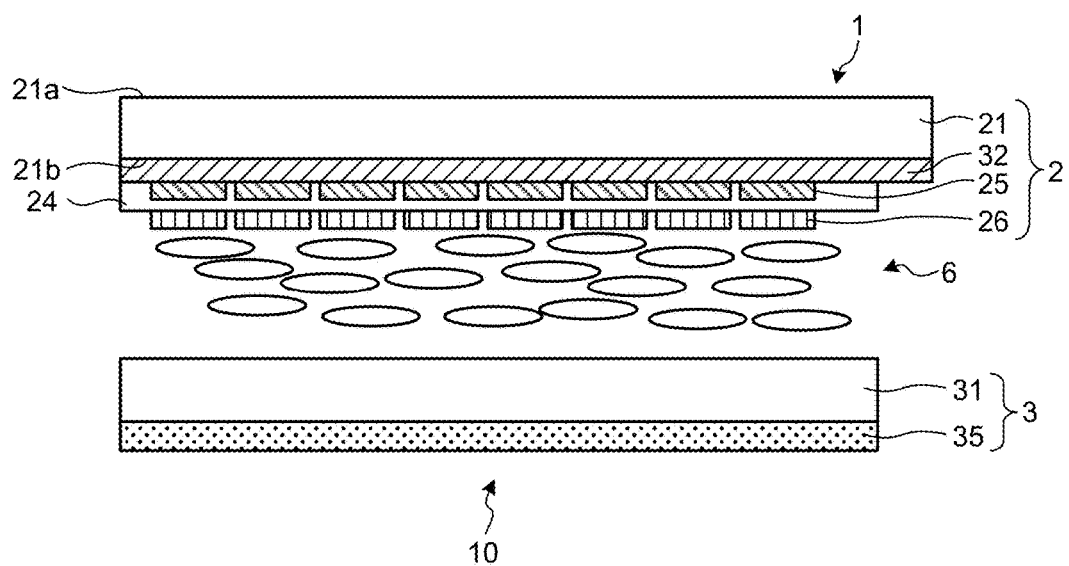
FIG. 5 is a sectional view of a schematic sectional structure of the display apparatus according to the first embodiment.

The calculator 40 is a circuit that determines whether a touch is made on the detection device 30 based on the control signals supplied from the display controller 11 and on the detection signals Vdet supplied from the first electrodes 25 (refer to FIG. 5). If a touch is detected, the calculator 40 calculates the coordinates at which the touch input is performed, for example.

Figure 2:
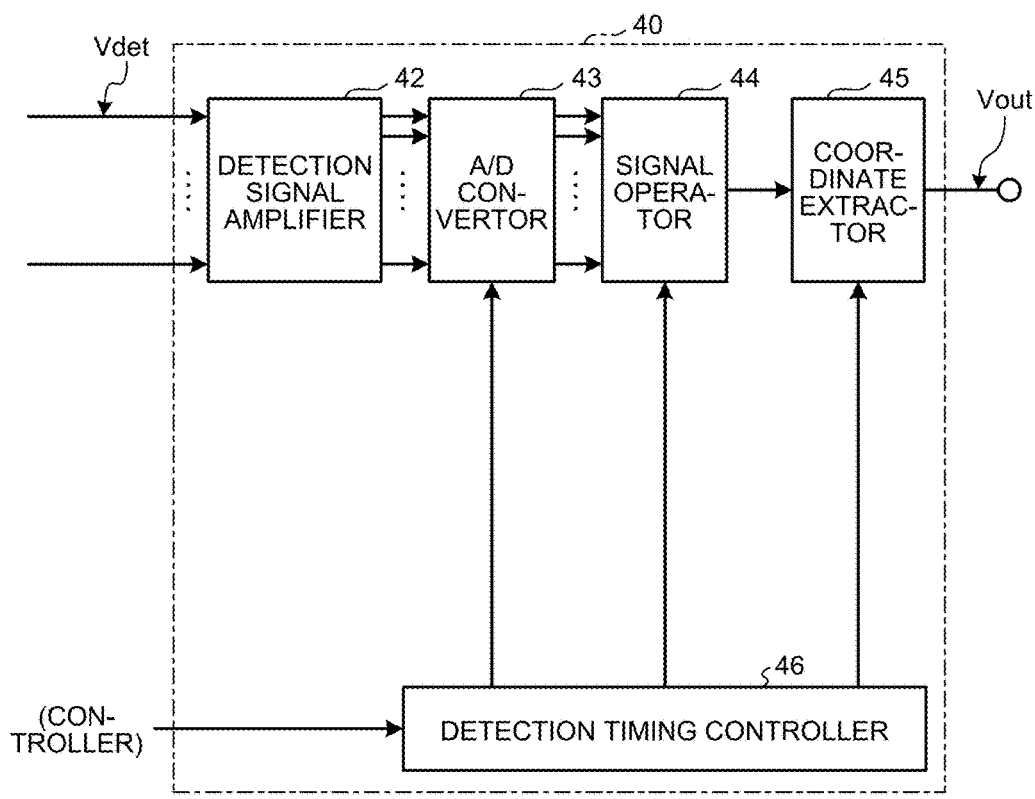
FIG. 2 is a block diagram of an exemplary configuration of a calculator.

FIG. 2 is a block diagram of an exemplary configuration of the calculator. The calculator 40 includes a detection signal amplifier 42, an analog/digital (A/D) converter 43, a signal operator 44, a coordinate extractor 45, and a detection timing controller 46. The detection timing controller 46 performs control such that the A/D converter 43, the signal operator 44, and the coordinate extractor 45 operate synchronously with one another based on the control signals supplied from the display controller 11.

Figure 3:
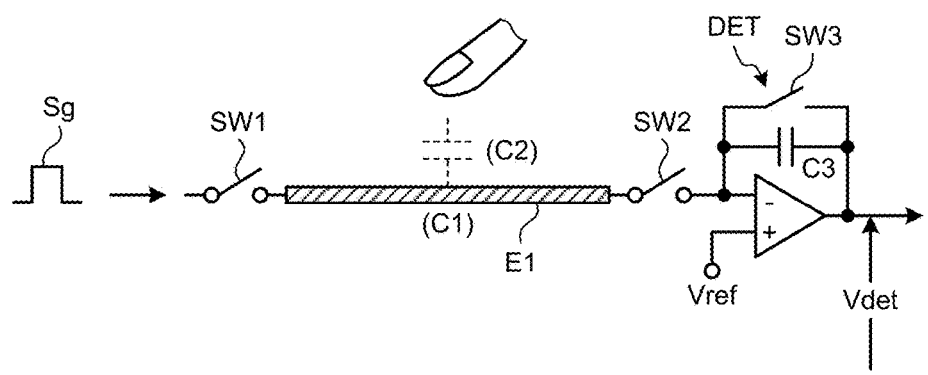
FIG. 3 is a diagram for explaining the basic principle of self-capacitance touch detection.
Figure 4:
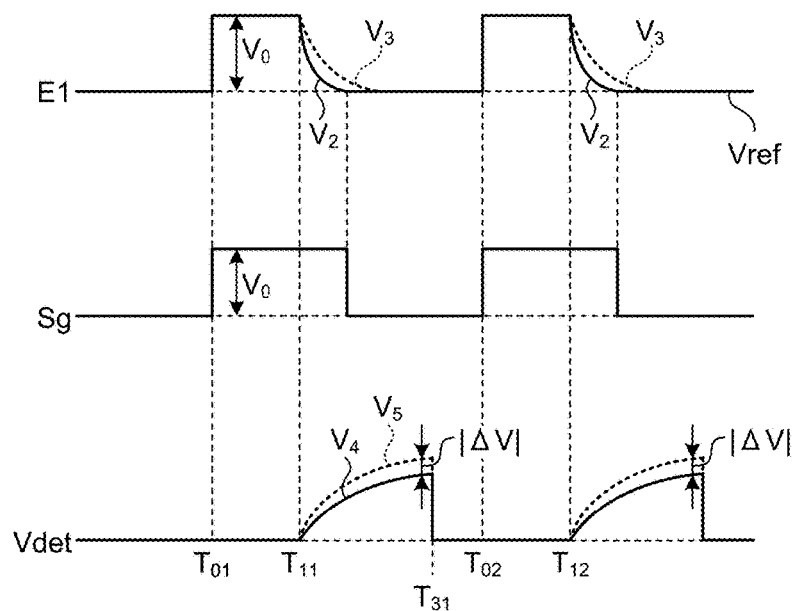
FIG. 4 is a diagram of an example of waveforms of a drive signal and a detection signal in self-capacitance touch detection.

As described above, the detection device 30 operates based on the basic principle of capacitance touch detection. The following describes the basic principle of self-capacitance touch detection with reference to FIGS. 3 and 4. FIG. 3 is a diagram for explaining the basic principle of self-capacitance touch detection. FIG. 4 is a diagram of an example of waveforms of a drive signal and a detection signal in self-capacitance touch detection. FIG. 3 also illustrates a detection circuit.

In a state where a finger is neither in contact with nor in proximity to a detection electrode E1, an AC rectangular wave Sg at a predetermined frequency (e.g., approximately several kilohertz to several hundred kilohertz) is applied to the detection electrode E1. The detection electrode E1 has capacitance C1, and an electric current depending on the capacitance C1 flows. A voltage detector DET converts fluctuations in the electric current depending on the AC rectangular wave Sg into fluctuations in the voltage (waveform $V_4$ indicated by the solid line (refer to FIG. 4)). The voltage detector DET is an integration circuit included in the detection signal amplifier 42 illustrated in FIG. 2, for example.

As illustrated in FIG. 3, in a state where a finger is in contact with or in proximity to the detection electrode E1, capacitance C2 between the finger and the detection electrode E1 is added to the capacitance C1 of the detection electrode E1. When the AC rectangular wave Sg is applied to the detection electrode E1, an electric current depending on the capacitance C1 and the capacitance C2 flows. As illustrated in FIG. 4, the voltage detector DET converts fluctuations in the electric current depending on the AC rectangular wave Sg into fluctuations in the voltage (waveform $V_5$ indicated by the dotted line). The presence of an external object in contact with or in proximity to the detection electrode E1 (presence of a touch) can be detected based on an absolute value $|\Delta V|$ of the difference between the waveform $V_4$ and the waveform $V_5$.

Specifically, as illustrated in FIG. 4, the voltage level of the AC rectangular wave Sg rises by an amount corresponding to voltage $V_0$ at time $T_{01}$. At this time, a switch SW1 is turned on, and a switch SW2 is turned off. As a result, the voltage level of the detection electrode E1 also rises by voltage $V_0$.

Subsequently, the switch SW1 is turned off before time $T_{11}$. At this time, the electric potential of the detection electrode E1 is maintained at $V_0$ by the capacitance C1 of the detection electrode E1 or the capacitance (C1+C2, refer to FIG. 3) obtained by adding the capacitance C2 generated by contact or proximity of a finger or the like to the capacitance C1 of the detection electrode E1. Subsequently, a switch SW3 is turned on before time $T_{11}$ and is turned off after a predetermined time has elapsed, thereby resetting the voltage detector DET. This reset operation causes the detection signal Vdet to have a voltage substantially equal to Vref.

Subsequently, when the switch SW2 is turned on at time $T_{11}$, the output from the voltage detector DET rises (Vdet) because the electric charge accumulated in the capacitance C1 (or C1+C2) of the detection electrode E1 moves to capacitance C3 in the voltage detector DET. When a finger or the like is not in proximity to the detection electrode E1, the output (detection signal Vdet) from the voltage detector DET is represented by the waveform $V_4$ indicated by the solid line, and Vdet=C1×$V_0$/C3 is satisfied. When capacitance generated by an effect of a finger or the like is added, the output is represented by the waveform $V_5$ indicated by the dotted line, and Vdet=(C1+C2)×$V_0$/C3 is satisfied.

Subsequently, at time $T_{31}$, the switch SW2 is turned off, and the switch SW1 and the switch SW3 are turned on. As a result, the electric potential of the detection electrode E1 is reduced to a low level, and the voltage detector DET is reset. The operation described above is repeated at a predetermined frequency (e.g., approximately several kilohertz to several hundred kilohertz).

The detection signal amplifier 42 illustrated in FIG. 2 amplifies the detection signals Vdet supplied from the detection device 30. The A/D converter 43 samples the analog signals output from the detection signal amplifier 42 at a timing synchronized with the drive signals Vs, thereby converting the analog signals into digital signals.

The signal operator 44 is a logic circuit that determines whether a touch is made on the detection device 30 based on the output signals from the A/D converter 43. The signal operator 44 performs processing of extracting only the difference between the detection signals caused by a finger. The signal of difference caused by the finger corresponds to the absolute value $|\Delta V|$ of the difference between the waveform $V_4$ and the waveform $V_5$.

The signal operator 44 compares the absolute value $|\Delta V|$ with a predetermined threshold voltage. If the absolute value $|\Delta V|$ is lower than the threshold voltage, the signal operator 44 determines that an external object is in a non-contact state. By contrast, if the absolute value $|\Delta V|$ is equal to or higher than the threshold voltage, the signal operator 44 determines that an external object is in a contact state. The calculator 40 thus can perform touch detection.

The coordinate extractor 45 is a logic circuit that calculates, when the signal operator 44 detects a touch, the touch panel coordinates of the touch. The coordinate extractor 45 calculates the touch panel coordinates and outputs the derived touch panel coordinates as output Vout. As described above, the display apparatus 1 according to the present embodiment can derive the touch panel coordinates at which an external object, such as a finger, is in contact with or in proximity to the detection device 30 based on the basic principle of self-capacitance touch detection.

The following describes an exemplary configuration of the display apparatus 1 according to the present embodiment in detail. FIG. 5 is a sectional view of a schematic sectional structure of the display apparatus according to the first embodiment.

As illustrated in FIG. 5, the display device with a detection function 10 includes a pixel substrate 2, a counter substrate 3, and a display functional layer (e.g., a liquid crystal layer 6). The counter substrate 3 faces the pixel substrate 2 in a direction perpendicular to the surface of the pixel substrate 2. The display functional layer is provided between the pixel substrate 2 and the counter substrate 3. In other words, the display functional layer is provided between a first basement 21 and a second basement 31. The display functional layer may be included in the pixel substrate 2.

The pixel substrate 2 includes the first basement 21, a plurality of second electrodes 26 (pixel electrodes), a plurality of first electrodes 25 (detection electrodes), an insulating layer 24, and a color filter 32. The first basement 21 has a first surface 21a and a second surface 21b opposite to the first surface 21a. The first surface 21a of the first basement 21 according to the present embodiment serves as a display surface on which an image is displayed and as a detection surface on which an external object, such as a finger, in contact with or in proximity to the detection device 30 is detected.

The second electrodes 26 are arranged in a matrix (row-column configuration) on the side of the second surface 21b of the first basement 21. The first electrodes 25 are provided between the first basement 21 and the second electrodes 26. The insulating layer 24 provides electrical insulation between the first electrodes 25 and the second electrodes 26. The first electrodes 25, the insulating layer 24, and the second electrodes 26 are disposed in this order from the second surface 21b of the first basement 21. The first electrodes 25 and the second electrodes 26 are made of a translucent conductive material, such as indium tin oxide (ITO).

The first basement 21 is a glass substrate or a resin substrate. The first basement 21 may be obtained by providing a polarizing plate (not illustrated) on a film-like resin substrate, such as a polyimide film. In a case where the first basement 21 is a glass substrate, a polarizing plate (not illustrated) may be provided on the glass substrate with an adhesive layer interposed therebetween. The first basement 21 is provided with thin film transistors (TFTs).

The color filter 32 is provided on the second surface 21b of the first basement 21 and faces the liquid crystal layer 6. The color filter 32 may be arranged on the second basement 31.

The counter substrate 3 includes the second basement 31 and a polarizing plate 35. The second basement 31 is a glass substrate or a resin substrate. The second basement 31 may be a film-like resin substrate, such as a polyimide film.

The liquid crystal layer 6 is provided between the first basement 21 and the second basement 31. The liquid crystal layer 6 modulates light passing therethrough depending on the state of an electric field. The liquid crystal layer 6, for example, includes liquid crystals in a lateral electric-field mode, such as the in-plane switching (IPS) mode including the fringe field switching (FFS) mode. An orientation film may be provided between the liquid crystal layer 6 and the pixel substrate 2 and between the liquid crystal layer 6 and the counter substrate 3 illustrated in FIG. 5.

An illuminator (backlight), which is not illustrated, is provided on the lower side of the second basement 31. The illuminator includes a light source, such as light emitting diodes (LEDs), and outputs light from the light source to the second basement 31. The light output from the illuminator passes through the polarizing plate 35 and the second basement 31. A part from which the light is blocked and not output and a part from which the light is output are switched depending on the state of the liquid crystals at the position. As a result, an image is displayed on the display surface.

Figure 6:
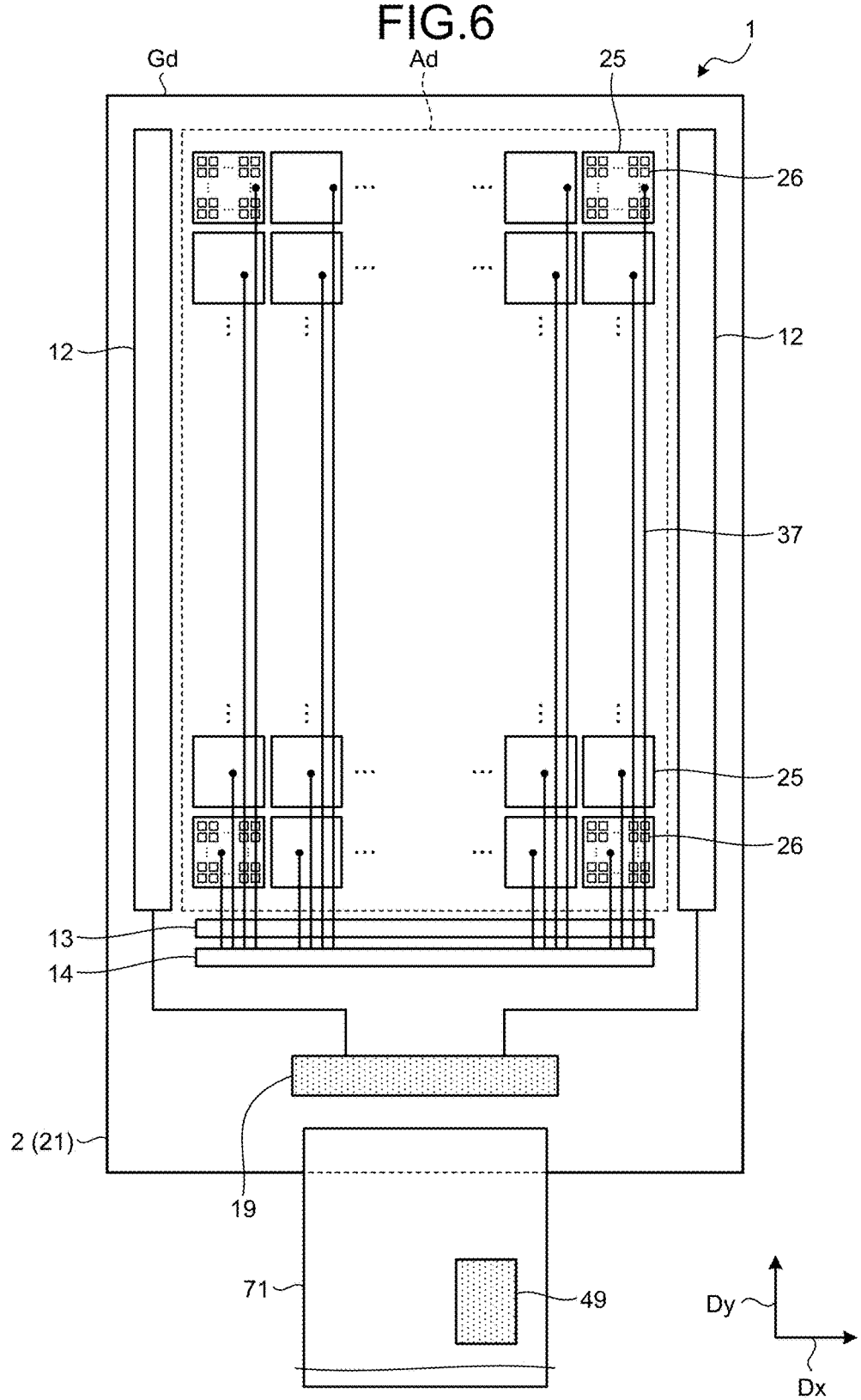
FIG. 6 is a plan view schematically illustrating a first basement of the display apparatus.

FIG. 6 is a plan view schematically illustrating the first basement of the display apparatus. FIG. 6 is a plan view of the first basement 21 viewed from the second surface 21b side. As illustrated in FIG. 6, the first basement 21 has a display area Ad and a frame area Gd. The display area Ad is an area on which an image is displayed by the display panel 20. The frame area Gd is an area outside the display area Ad. A plurality of first electrodes 25 are provided in a matrix (row-column configuration) at positions overlapping with the display area Ad of the first basement 21. The direction along the short side of the display area Ad is referred to as a first direction Dx, and the direction intersecting with the first direction Dx is referred to as a second direction Dy. The first electrode 25 has a rectangular shape and a plurality of first electrodes 25 are respectively arrayed in the first direction Dx and the second direction Dy. While the first electrodes 25 have a rectangular shape, the shape is not limited thereto. The first electrodes 25 may have another shape. The first electrodes 25 may have a polygonal shape or a comb shape, for example.

A plurality of second electrodes 26 are provided in a manner overlapping with the first electrodes 25. The second electrode 26 has an area smaller than that of the first electrode 25 in planar view. A plurality of second electrodes 26 are arranged in a matrix (row-column configuration) in an area overlapping with one first electrode 25. While only part of the second electrodes 26 are illustrated in FIG. 6, the second electrodes 26 are arrayed in a matrix (row-column configuration) in the whole area of the display area Ad.

The frame area Gd of the first basement 21 is provided with the gate driver 12, the source driver 13, the first electrode driver 14, and a first semiconductor integrated circuit (hereinafter, referred to as a "first IC") 19. The frame area Gd is coupled to a printed circuit board 71 and a second semiconductor integrated circuit (hereinafter, referred to as a "second IC") 49 mounted on the printed circuit board 71. The printed circuit board 71 is a flexible printed circuit board, for example.

The first IC 19 is a chip of an IC driver mounted on the first basement 21. The first IC 19 is a control device including various circuits required for a display operation and serving as the display controller 11 illustrated in FIG. 1. The second IC 49 serves as the detection controller 16 illustrated in FIG. 1. The arrangement of the gate driver 12, the source driver 13, and the first electrode driver 14 illustrated in FIG. 6 is given by way of example only and may be appropriately modified. Part or all of the functions of the gate driver 12, the source driver 13, and the first electrode driver 14 may be included in the first IC 19 or the second IC 49. Part of the functions of the calculator 40 may be included in the first IC 19 or an external micro-processing unit (MPU).

Coupling wires 37 are coupled to the respective first electrodes 25. The coupling wires 37 extend in the second direction Dy from the display area Ad to the frame area Gd, thereby coupling the first electrodes 25 to the first electrode driver 14. The first electrode driver 14 supplies the drive signals Vs to the first electrodes 25 via the coupling wires 37. The first electrodes 25 output, to the calculator 40 of the detection controller 16, the detection signals Vdet based on a change in the capacitance of the respective first electrodes 25 via the coupling wires 37.

The first electrodes 25 according to the present embodiment correspond to the detection electrode E1 in the basic principle of self-capacitance touch detection described above. The detection device 30 can detect a finger in contact with or in proximity to the detection device 30 according to the basic principle of self-capacitance touch detection described above. As illustrated in FIG. 6, the first electrodes 25 are arranged in a matrix (row-column configuration) in the display area Ad and each serve as a touch sensor. The detection controller 16 supplies the drive signals Vs simultaneously or sequentially to the first electrodes 25 in the whole display area Ad, thereby performing a detection operation on the detection surface.

Figure 7:
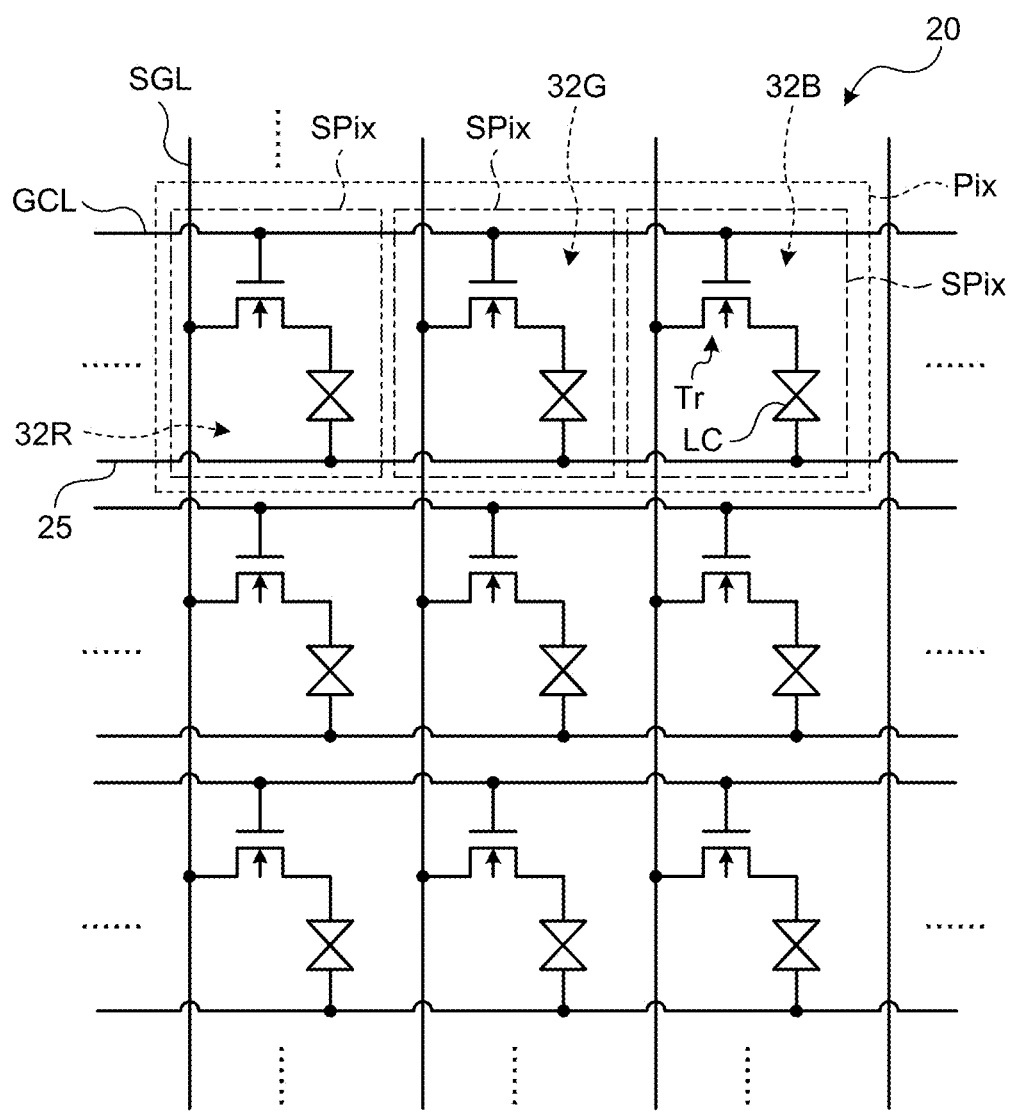
FIG. 7 is a circuit diagram of a pixel array in a display device with a detection function according to the first embodiment.

The following describes a display operation performed by the display panel 20. FIG. 7 is a circuit diagram of a pixel array in the display device with a detection function according to the first embodiment. The first basement 21 (refer to FIGS. 5 and 6) is provided with switching elements Tr of respective sub-pixels SPix and wires, such as source lines SGL and gate lines GCL, illustrated in FIG. 7. The source lines SGL are wires that supply the pixel signals Vpix to the respective second electrodes 26. The gate lines GCL are wires that supply drive signals for driving the respective switching elements Tr. The source lines SGL and the gate lines GCL extend on a plane parallel to the surface of the first basement 21.

The display panel 20 illustrated in FIG. 7 includes a plurality of sub-pixels SPix arrayed in a matrix (row-column configuration). The sub-pixels SPix each include the switching element Tr and a liquid crystal element LC. The switching element Tr is a thin-film transistor and is an n-channel metal oxide semiconductor (MOS) TFT in this example.

The liquid crystal element LC is coupled to the switching element Tr via the second electrode 26 (not illustrated in FIG. 7). A first end of the liquid crystal element LC is coupled to one of the source and the drain of the switching element Tr, and a second end thereof is coupled to the first electrode 25. The sub-pixel SPix is driven based on the electric charge supplied to the first electrode 25 and the second electrode 26. The insulating layer 24 is provided between the second electrodes 26 and the first electrodes 25 (common electrodes) to generate holding capacitance.

The gate driver 12 illustrated in FIG. 1 drives to sequentially scan the gate lines GCL. The gate driver 12 applies the scanning signals Vscan (refer to FIG. 1) to the gates of the switching elements Tr of the sub-pixels SPix via the gate line GCL. The gate driver 12 thus sequentially selects one row (one horizontal line) out of the sub-pixels SPix as a target of display drive. The source driver 13 supplies the pixel signals Vpix to the sub-pixels SPix constituting the selected one horizontal line via the source lines SGL. These sub-pixels SPix perform display in units of one horizontal line based on the supplied pixel signals Vpix. To perform the display operation, the first electrode driver 14 applies the display drive signals Vcom to the first electrodes 25. As a result, the first electrodes 25 serve as the common electrodes for the second electrodes 26 in the display operation.

The color filter 32 illustrated in FIG. 5, for example, may include periodically arrayed color filters 32R, 32G, and 32B in three colors of red (R), green (G), and blue (B), respectively. The color filters 32R, 32G, and 32B serving as a set correspond to the respective sub-pixels SPix illustrated in FIG. 7. A set of the sub-pixels SPix corresponding to the respective three colors of R, G, and B serves as a pixel Pix.

The first electrodes 25 illustrated in FIGS. 6 and 7 serve as the common electrodes that apply a common potential to a plurality of sub-pixels SPix in the display panel 20. The first electrodes 25 also serve as the detection electrodes in touch detection performed by the detection device 30. The following describes a detection operation performed by the detection device 30 in detail.

Figure 8:
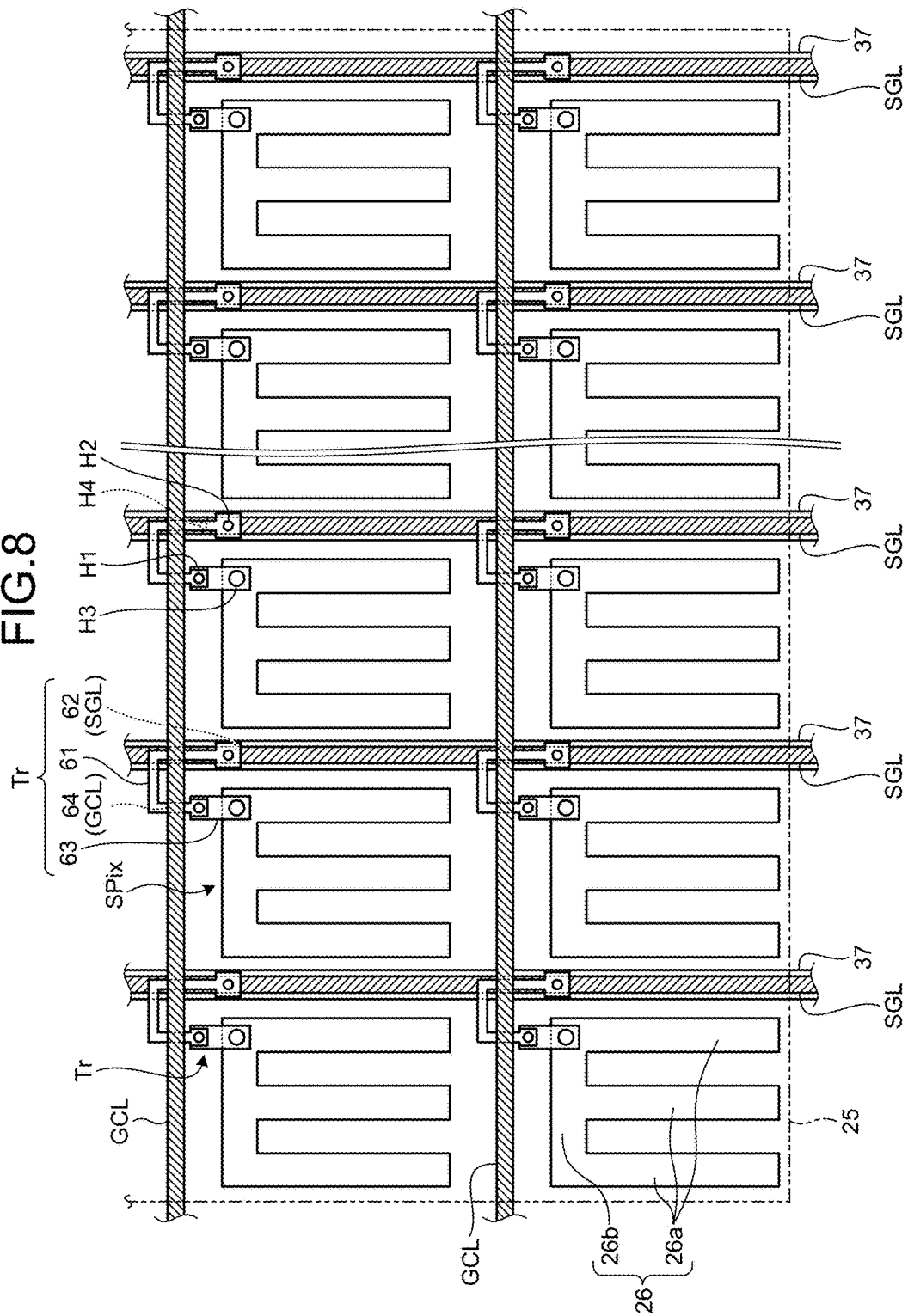
FIG. 8 is a schematic plan view of the relation in an array of first electrodes and second electrodes.
Figure 9:
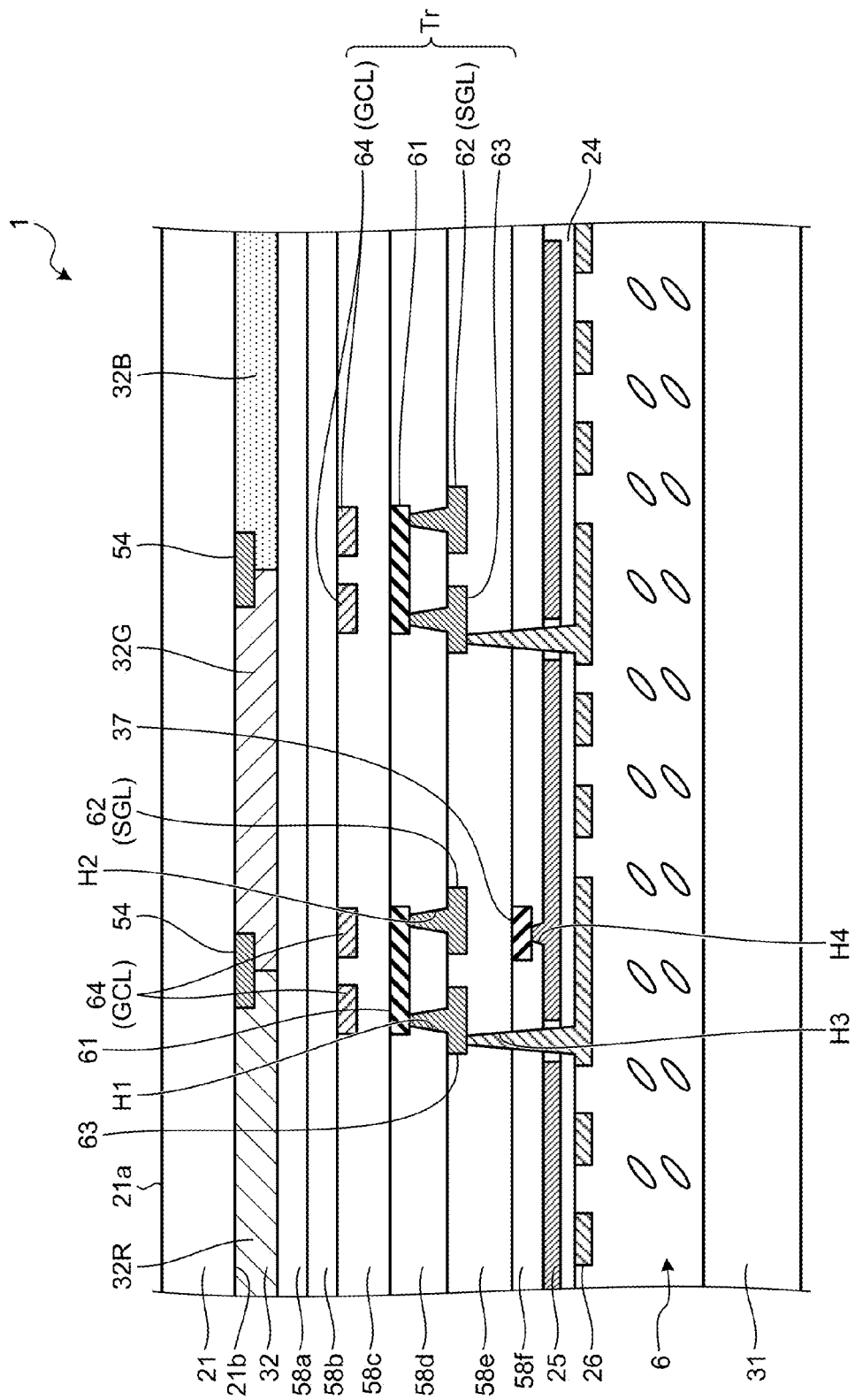
FIG. 9 is a schematic sectional view for explaining the relation among the first electrodes, the second electrodes, and switching elements in the display apparatus according to the first embodiment.

FIG. 8 is a schematic plan view of the relation in an array of the first electrodes and the second electrodes. FIG. 9 is a schematic sectional view for explaining the relation among the first electrodes, the second electrodes, and the switching elements in the display apparatus according to the first embodiment. FIG. 8 is a plan view viewed from the first surface 21a side.

As illustrated in FIG. 8, a plurality of second electrodes 26 are arranged in a matrix (row-column configuration) at positions overlapping with one first electrode 25. The switching elements Tr are provided at the positions corresponding to the respective second electrodes 26. The gate line GCL extends in the row direction and a plurality of gate lines GCL are arrayed in the column direction. The source line SGL extends in the column direction intersecting with the extending direction of the gate lines GCL and a plurality of source lines SGL are arrayed in the row direction. The switching elements Tr are arranged at the intersections of the gate lines GCL and the source lines SGL. The area surrounded by the gate lines GCL and the source lines SGL corresponds to the sub-pixel SPix. The sub-pixel SPix is provided to include an area in which the first electrode 25 overlaps with the second electrode 26.

The coupling wires 37 according to the present embodiment are provided at positions overlapping with the source lines SGL and extend in the same direction as the extending direction of the source lines SGL. The coupling wires 37 are arranged at the positions not overlapping with the second electrodes 26 but with the first electrodes 25. The coupling wires 37 are individually coupled to the respective first electrodes 25 arrayed in the column direction. The coupling wires 37 according to the present embodiment are made of at least one metal material out of aluminum (Al), copper (Cu), silver (Ag), molybdenum (Mo), and an alloy of these metals. The coupling wires 37 may be a multilayered body having a plurality of layers made of one or more of the metal materials described above. Alternatively, the coupling wires 37 may be made of a translucent conductive material, such as ITO.

The second electrodes 26 each include a plurality of strip-like electrodes 26a and a connection 26b. The strip-like electrode 26a extends in the extending direction of the source lines SGL and a plurality of strip-like electrodes are arrayed in the extending direction of the gate lines GCL. The connection 26b connects ends of the strip-like electrodes 26a.

The array of the second electrodes 26 is not limited to the matrix array in which those are arrayed in the row direction and the column direction. Alternatively, adjacent second electrodes 26 may be arranged in a manner shifting in the row direction or the column direction. The adjacent second electrodes 26 may have different sizes. Still alternatively, two or three second electrodes 26 arrayed in the column direction may be arranged side by side with one second electrode 26 in the row direction.

As illustrated in FIGS. 8 and 9, the switching elements Tr each include a semiconductor layer 61, a source electrode 62, a drain electrode 63, and gate electrodes 64. The semiconductor layer 61 may be made of a publicly known material, such as polysilicon and an oxide semiconductor. The use of the semiconductor layer 61 made of a transparent amorphous oxide semiconductor (TAOS), for example, can increase the ability (retention) to retain the voltage for video display for a long time and improve the display quality.

As illustrated in FIG. 8, each of the second electrodes 26 is coupled to the drain electrode 63 of the switching element Tr through a contact hole H3. The semiconductor layer 61 is coupled to the drain electrode 63 through a contact hole H1 and bent in a manner intersecting with the gate line GCL at a plurality of positions in planar view. The portions in the gate line GCL overlapping with the semiconductor layer 61 serve as the gate electrodes 64. The semiconductor layer 61 extends to the position overlapping with the source line SGL and is electrically coupled to the source line SGL through a contact hole H2. The portion in the source line SGL overlapping with the semiconductor layer 61 serves as the source electrode 62.

As illustrated in FIG. 9, the color filters 32R, 32G, and 32B are provided on the second surface 21b of the first basement 21 in correspondence with the respective sub-pixels Spix. Light-shielding portions 54 are provided on the second surface 21b of the first basement 21 at the boundaries between the color filters 32R, 32G, and 32B. The switching elements Tr are provided at the positions overlapping with the boundaries between the color filters 32R, 32G, and 32B.

The gate electrodes 64 are provided on the lower side of the color filter 32 with a planarization layer 58a and an insulating layer 58b interposed therebetween. The gate electrodes 64 are arranged at the positions overlapping with the light-shielding portion 54. The semiconductor layer 61 is provided on the lower side of the gate electrodes 64 with an insulating layer 58c interposed therebetween. The source electrode 62 and the drain electrode 63 are provided on the lower side of the semiconductor layer 61 with an insulating layer 58d interposed therebetween. While the source electrode 62 and the drain electrode 63 are provided to the same layer, those may be provided to different layers. In the present specification, the "upper side" means a direction from the second basement 31 to the first basement 21 in the direction perpendicular to the second surface 21b, and the "lower side" means a direction from the first basement 21 to the second basement 31. The "planar view" means a view seen in the direction perpendicular to the surface of the first basement 21.

The coupling wire 37 is provided on the lower side of the source electrode 62 and the drain electrode 63 with an insulating layer 58e interposed therebetween. The first electrode 25 is provided on the lower side of the coupling wire 37 with an insulating layer 58f interposed therebetween. The first electrode 25 is electrically coupled to the coupling wire 37 through a contact hole H4. The second electrode 26 is provided on the lower side of the first electrode 25 with the insulating layer 24 interposed therebetween. The second electrode 26 is electrically coupled to the drain electrode 63 through the contact hole H3. The liquid crystal layer 6 is provided between the first electrode 25 and the second basement 31. In other words, the gate electrodes 64 are arranged between the color filter 32 and the semiconductor layer 61 in the direction perpendicular to the second surface 21b. The source electrode 62 and the drain electrode 63 are arranged between the semiconductor layer 61 and the coupling wire 37. The first electrode 25 is arranged between the coupling wire 37 and the second electrode 26. The liquid crystal layer 6 is arranged between the second electrode 26 and the second basement 31.

With this configuration, the gate lines GCL, the switching elements Tr and the source lines SGL, the first electrodes 25, and the second electrodes 26 are disposed in this order from the first basement 21 to the liquid crystal layer 6 serving as the display functional layer. In other words, the liquid crystal layer 6 is not provided between the first surface 21a serving as the detection surface in a detection operation and the first electrodes 25 serving as the detection electrodes. This configuration suppresses a change in the capacitance of the first electrodes 25 when the permittivity of the liquid crystal layer 6 changes because of a change in the orientation state of the liquid crystals in the liquid crystal layer 6, for example. Consequently, the display apparatus 1 according to the present embodiment can suppress noise in the detection operation and improve the detection performance.

Figure 10:
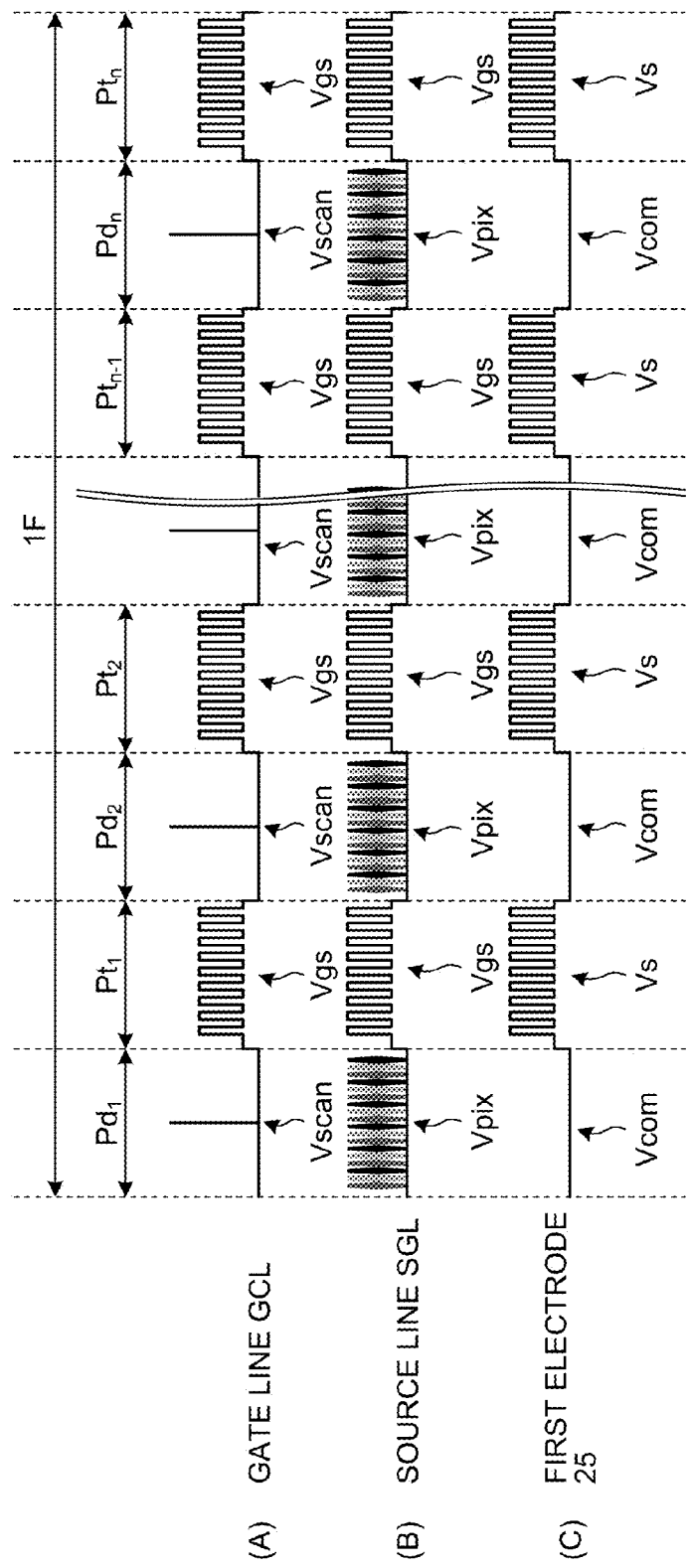
FIG. 10 is a timing waveform diagram of an exemplary operation performed by the display apparatus according to the first embodiment.

FIG. 10 is a timing waveform diagram of an exemplary operation performed by the display apparatus according to the first embodiment. As illustrated in FIG. 10, one frame period (1F) includes a plurality of display periods $Pd_1$, $Pd_2$, . . . and $Pd_1$, and a plurality of detection periods $Pt_1$, $Pt_2$, . . . and $Pt_n$. A display operation is performed in the display periods $Pd_1$, $Pd_2$, . . . and $Pd_n$. A self-capacitance detection operation is performed in the detection periods $Pt_1$, $Pt_2$, . . . and $Pt_n$. These periods are alternately arranged on a temporal axis like the display period $Pd_1$, the detection period $Pt_1$, the display period $Pd_2$, and the detection period $Pt_2$. The display periods Pd and the detection periods Pt are switched based on the control signals supplied from the display controller 11.

In the display periods Pd, the display controller 11 supplies the scanning signals Vscan to the gate lines GCL via the gate driver 12, thereby selecting pixels Pix serving as a target of display drive. The display controller 11 supplies the pixel signals Vpix to the pixels Pix in a plurality of rows selected in the display periods $Pd_1$, $Pd_2$, . . . and $Pd_1$, via the source driver 13 and the source lines SGL. FIG. 10 illustrates video signals (Sig) for the respective colors of RGB, for example. Sub-pixels SPix corresponding to the respective colors of RGB are selected and supplied with the video signals (Sig) for the respective colors, thereby performing an operation for displaying an image. In the display periods Pd in one frame period (1F), video information of one screen is displayed.

In the display periods Pd, the first electrodes 25 serve as the common electrodes for the display panel 20. The first electrode driver 14 supplies the drive signals Vcom serving as a common potential for display to selected part or all of the first electrodes 25.

In the detection periods Pt, the detection controller 16 supplies the detection drive signals Vs from the first electrode driver 14 to the first electrodes 25. Based on the basic principle of self-capacitance touch detection described above, the first electrodes 25 output the detection signals Vdet based on a change in the capacitance of the first electrodes 25 to the calculator 40 via the coupling wires 37.

In the detection periods Pt, the guard electrode driver 17 (refer to FIG. 1) supplies the guard signals Vgs to the gate lines GCL and the source lines SGL. The guard signals Vgs are voltage signals synchronized with and having the same waveform as that of the drive signals Vs. In other words, the guard signals Vgs have the same amplitude and the same frequency as those of the drive signals Vs. With this configuration, the gate lines GCL and the source lines SGL are driven at the same electric potential as that of the first electrodes 25, thereby suppressing capacitive coupling of the gate lines GCL and the source lines SGL with respect to the first electrodes 25. When the capacitance of the gate lines GCL and the source lines SGL changes, this configuration suppresses a change in the capacitance of the first electrodes 25 caused when the drive signals Vs are supplied thereto. Consequently, the present embodiment can suppress noise in touch detection and reduction in the detection sensitivity.

The guard electrode driver 17 illustrated in FIG. 1 may be included in the first electrode driver 14. In this case, the first electrode driver 14 may supply the guard signals Vgs to the gate lines GCL and the source lines SGL. Alternatively, the guard electrode driver 17 may be included in the display controller 11. In this case, the display controller 11 may supply the guard signals Vgs to the gate lines GCL and the source lines SGL via the gate driver 12 and the source driver 13, respectively. While the guard signals Vgs are supplied to both of the gate lines GCL and the source lines SGL in the example illustrated in FIG. 10, the configuration is not limited thereto. The guard signals Vgs may be supplied to one of the gate lines GCL and the source lines SGL.

As described above, the display apparatus 1 according to the present embodiment includes the first basement 21, the liquid crystal layer 6, the first electrodes 25, and the guard electrodes (the gate lines GCL and the source lines SGL). The first basement 21 has the first surface 21a and the second surface 21b on the side opposite to the first surface 21a. The liquid crystal layer 6 is arranged on the side of the second surface 21b of the first basement 21 and displays an image on the first surface 21a. The first electrodes 25 are arranged between the first basement 21 and the liquid crystal layer 6 and detect an object in contact with or in proximity to the first surface 21a. The guard electrodes are arranged between the first electrodes 25 and the first basement 21 and supplied with the guard signals Vgs for suppressing a change in the capacitance generated between the first electrodes 25 and the guard electrodes.

With this configuration, the gate lines GCL, the switching elements Tr and the source lines SGL, the first electrodes 25, and the second electrodes 26 are disposed in this order from the first basement 21 to the liquid crystal layer 6 serving as the display functional layer. In other words, the liquid crystal layer 6 is not provided between the first surface 21a serving as the detection surface in a detection operation and the first electrodes 25 serving as the detection electrodes. This configuration suppresses a change in the capacitance of the first electrodes 25 when the permittivity of the liquid crystal layer 6 changes because of a change in the orientation state of the liquid crystals in the liquid crystal layer 6, for example.

In the detection periods Pt, the display apparatus 1 according to the present embodiment supplies the guard signals Vgs to the gate lines GCL and the source lines SGL, thereby causing those to serve as the guard electrodes. This configuration suppresses capacitive coupling of the gate lines GCL and the source lines SGL with respect to the first electrodes 25. Consequently, the present embodiment can suppress noise in the detection operation and improve the detection performance.

Second Embodiment

Figure 11:
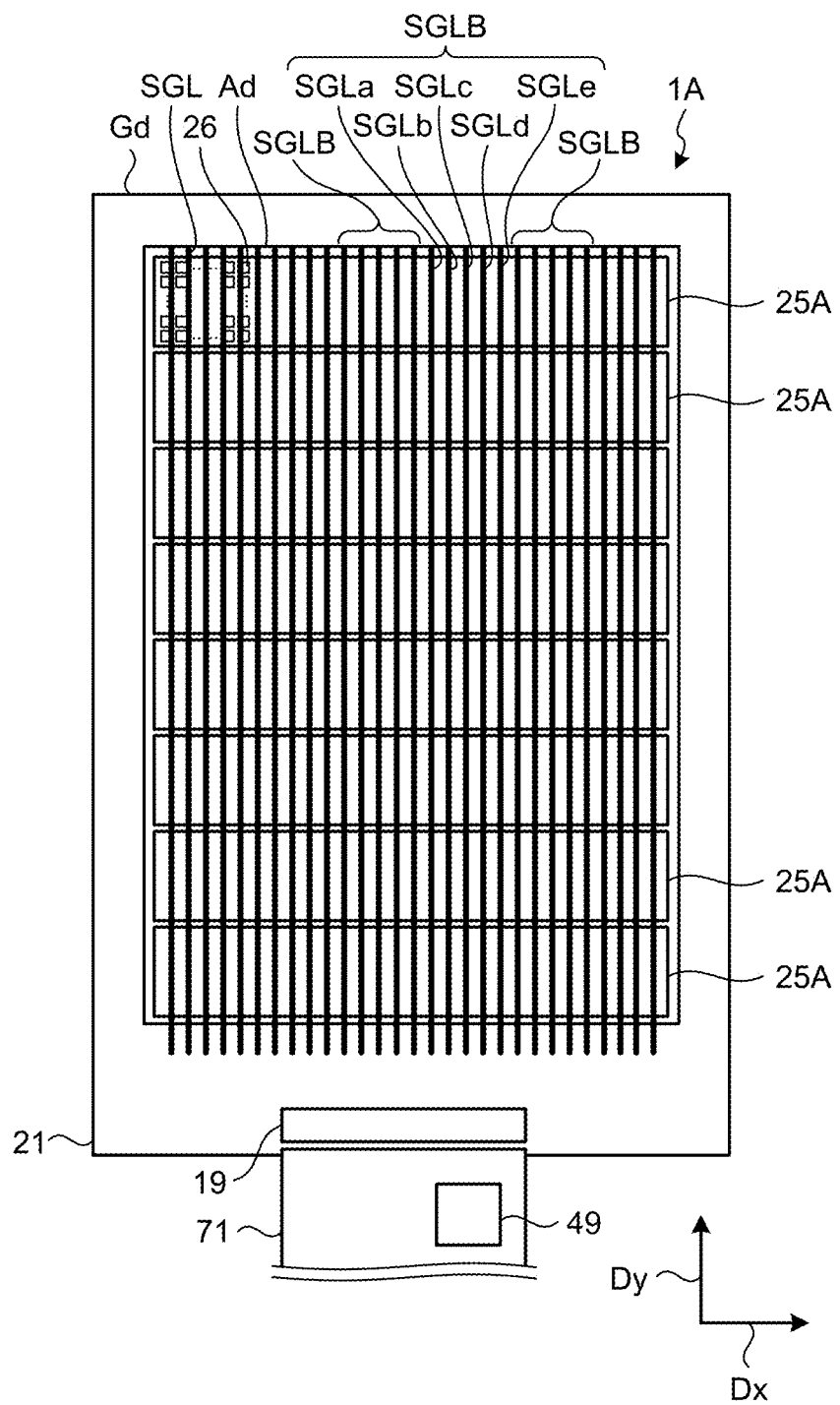
FIG. 11 is a plan view schematically illustrating the first basement of the display apparatus according to a second embodiment of the present invention.

FIG. 11 is a plan view schematically illustrating the first basement of the display apparatus according to a second embodiment of the present invention. In a display apparatus 1A according to the present embodiment, a first electrode 25A extends in the first direction Dx and a plurality of first electrodes 25A are arrayed in the second direction Dy. The source line SGL extends in the direction intersecting with the extending direction of the first electrodes 25A and a plurality of source lines SGL are arrayed in the extending direction of the first electrodes 25A. Capacitance is generated at the intersections of the first electrodes 25A and the source lines SGL. The display apparatus 1A according to the present embodiment can detect an external object in contact with or in proximity to the display apparatus 1A based on a change in the capacitance between the first electrodes 25A and the source lines SGL according to the basic principle of mutual capacitance touch detection.

Figure 12:
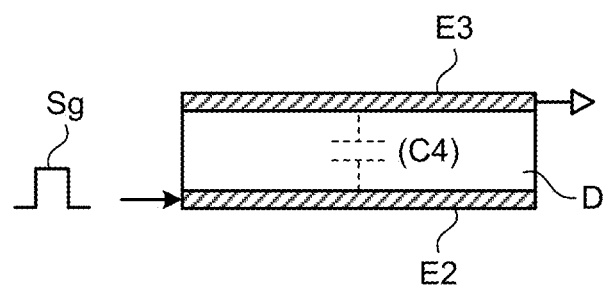
FIG. 12 is a diagram for explaining the basic principle of mutual capacitance touch detection.
Figure 13:
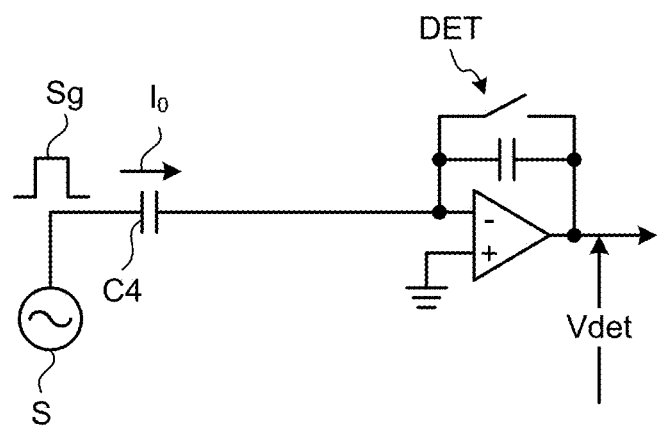
FIG. 13 is a diagram for explaining an example of an equivalent circuit for explaining the basic principle of mutual capacitance touch detection.
Figure 14:
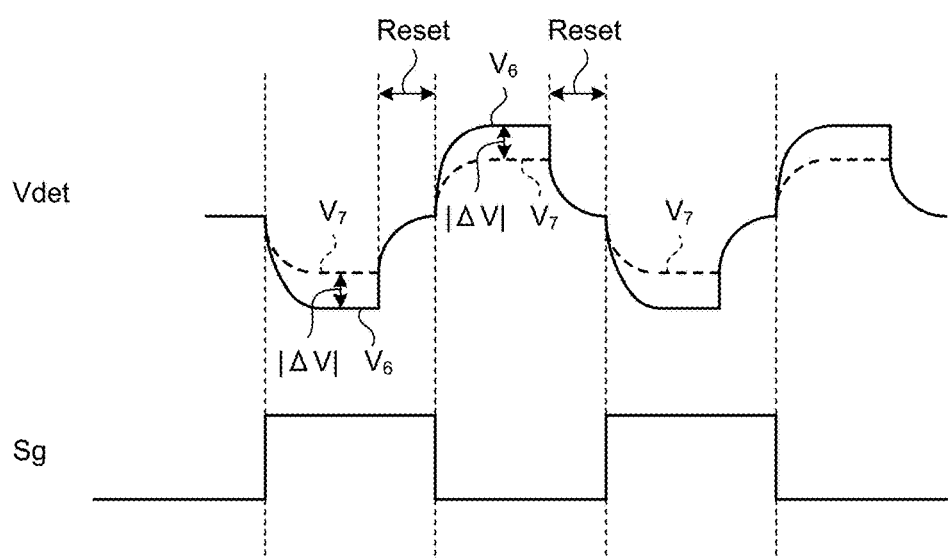
FIG. 14 is a diagram of an example of waveforms of the drive signal and the detection signal in mutual capacitance touch detection.

The following describes the basic principle of mutual capacitance touch detection performed by the display apparatus 1A according to the present embodiment with reference to FIGS. 12 to 14. FIG. 12 is a diagram for explaining the basic principle of mutual capacitance touch detection. FIG. 13 is a diagram for explaining an example of an equivalent circuit for explaining the basic principle of mutual capacitance touch detection. FIG. 14 is a diagram of an example of waveforms of the drive signal and the detection signal in mutual capacitance touch detection.

As illustrated in FIG. 12, for example, a capacitance element C4 includes a pair of electrodes, that is, a drive electrode E2 and a detection electrode E3 facing each other with a dielectric D interposed therebetween. The capacitance element C4 has fringe lines of electric force extending from ends of the drive electrode E2 to the upper surface of the detection electrode E3 besides lines of electric force (not illustrated) generated between the facing surfaces of the drive electrode E2 and the detection electrode E3. As illustrated in FIG. 13, a first end of the capacitance element C4 is coupled to an alternating-current (AC) signal source (drive signal source) S, and a second end thereof is coupled to the voltage detector DET.

When the AC signal source S applies an AC rectangular wave Sg at a predetermined frequency (e.g., approximately several kilohertz to several hundred kilohertz) to the drive electrode E2 (first end of the capacitance element C4), an output waveform (detection signal Vdet) illustrated in FIG. 14 is generated via the voltage detector DET coupled to the detection electrode E3 (second end of the capacitance element C4). The AC rectangular wave Sg corresponds to the drive signal Vs received from the first electrode driver 14.

In a state where a finger is neither in contact with nor in proximity to the detection electrode E3 (non-contact state), an electric current $I_0$ depending on the capacitance value of the capacitance element C4 flows in association with charge and discharge of the capacitance element C4 as illustrated in FIG. 13. The voltage detector DET converts fluctuations in the electric current depending on the AC rectangular wave Sg into fluctuations in the voltage (waveform $V_6$ indicated by the solid line (refer to FIG. 14)).

By contrast, in a state where a finger is in contact with or in proximity to the detection electrode E3 (contact state), the fringe lines of electric force between the drive electrode E2 and the detection electrode E3 are blocked by a conductor (finger). As a result, the capacitance element C4 acts as a capacitance element having a capacitance value smaller than that in the non-contact state. An electric current depending on the change in the capacitance value of the capacitance element C4 flows. As illustrated in FIG. 14, the voltage detector DET converts fluctuations in the electric current depending on the AC rectangular wave Sg into fluctuations in the voltage (waveform $V_7$ indicated by the dotted line). In this case, the waveform $V_7$ has amplitude smaller than that of the waveform $V_6$. Consequently, the absolute value $|\Delta V|$ of voltage difference between the waveform $V_6$ and the waveform $V_7$ varies depending on an effect of a conductor, such as a finger, in contact with or in proximity to the detection electrode E3 from the outside. To accurately detect the absolute value $|\Delta V|$ of the voltage difference, the voltage detector DET preferably operates with a period Reset for resetting charge and discharge of a capacitor based on the frequency of the AC rectangular wave Sg by switching in the circuit. The calculator 40 compares the absolute value $|\Delta V|$ with a predetermined threshold voltage, thereby determining whether an external object is in contact with or in proximity to the detection device 30.

The display apparatus 1A illustrated in FIG. 11 sequentially scans one detection block including one or a plurality of first electrodes 25A. The first electrode driver 14 supplies the drive signals Vs to the first electrodes 25A. The source lines SGL output, to the calculator 40, the detection signals Vdet based on a change in the capacitance between the first electrodes 25A and the source lines SGL. The display apparatus 1A according to the present embodiment thus performs mutual capacitance touch detection. In other words, in the display apparatus 1A according to the present embodiment, the first electrodes 25A correspond to the drive electrode E2, and the source lines SGL correspond to the detection electrode E3.

The multilayered structure of the first electrodes 25A, the second electrodes 26, and the source lines SGL according to the present embodiment is the same as that illustrated in FIG. 9. The gate lines GCL (not illustrated in FIG. 11), the switching elements Tr and the source lines SGL, the first electrodes 25A, the second electrodes 26, and the liquid crystal layer 6 are disposed in this order from the second surface 21b of the first basement 21. In other words, the liquid crystal layer 6 is not provided between the first surface 21a serving as the detection surface in a detection operation and the source lines SGL serving as the detection electrodes. This configuration suppresses a change in the capacitance between the first electrodes 25A and the source lines SGL when the permittivity of the liquid crystal layer 6 changes because of a change in the orientation state of the liquid crystals in the liquid crystal layer 6, for example. Consequently, the display apparatus 1A according to the present embodiment can suppress noise in the detection operation and improve the detection performance.

The source lines SGL are used as the signal lines that supply the pixel signals Vpix to the switching elements Tr in a display operation and as the detection electrodes that detect contact or proximity of an external object in a detection operation. This configuration does not require additional detection electrodes in another layer, thereby making the display apparatus 1A thinner. As illustrated in FIG. 11, the source lines SGL are arrayed at substantially the same pitch as the array pitch of the second electrodes 26 in the first direction Dx. The number of source lines SGL is more than that of the first electrodes 25A. The present embodiment can extract the detection signals Vdet from each detection electrode block SGLB including five source lines SGLa, SGLb, SGLc, SGLd, and SGLe, for example. In a detection operation, the source lines SGLa and SGLb in the detection electrode block SGLB serve as the detection electrodes and output the detection signals Vdet. The source lines SGLc, SGLd, and SGLe in the detection electrode block SGLB are in a floating state where no voltage signal is supplied thereto and those electric potential is not fixed. As a result, the source lines SGLc, SGLd, and SGLe output no detection signal Vdet. As described above, the present embodiment performs detection on each detection electrode block SGLB including a plurality of source lines SGL. Consequently, the present embodiment can provide appropriate detection resolution and reduce the amount of processing performed by the calculator 40.

The number of source lines SGL included in one detection electrode block SGLB and the number and the combination of source lines SGL coupled to the detection controller 16 in the detection electrode block SGLB may be appropriately modified. While the gate driver 12, the source driver 13, and other components are not illustrated in FIG. 11, the present embodiment may include the gate driver 12, the source driver 13, and other components on the frame area Gd as illustrated in FIG. 6.

Figure 15:
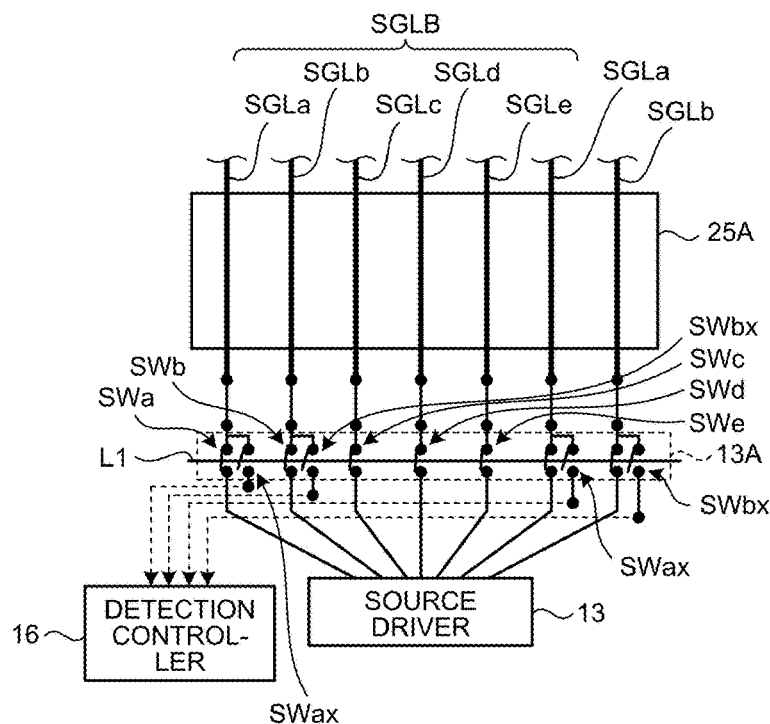
FIG. 15 is a schematic circuit diagram for explaining coupling of source lines to a detection controller in a display operation.
Figure 16:
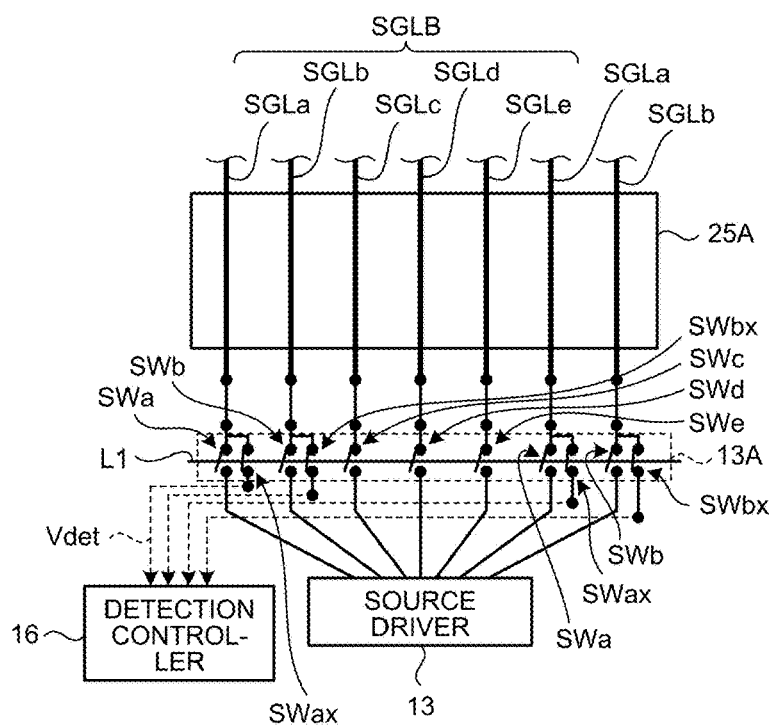
FIG. 16 is a schematic circuit diagram for explaining coupling of the source lines to the detection controller in a detection operation.
Figure 17:
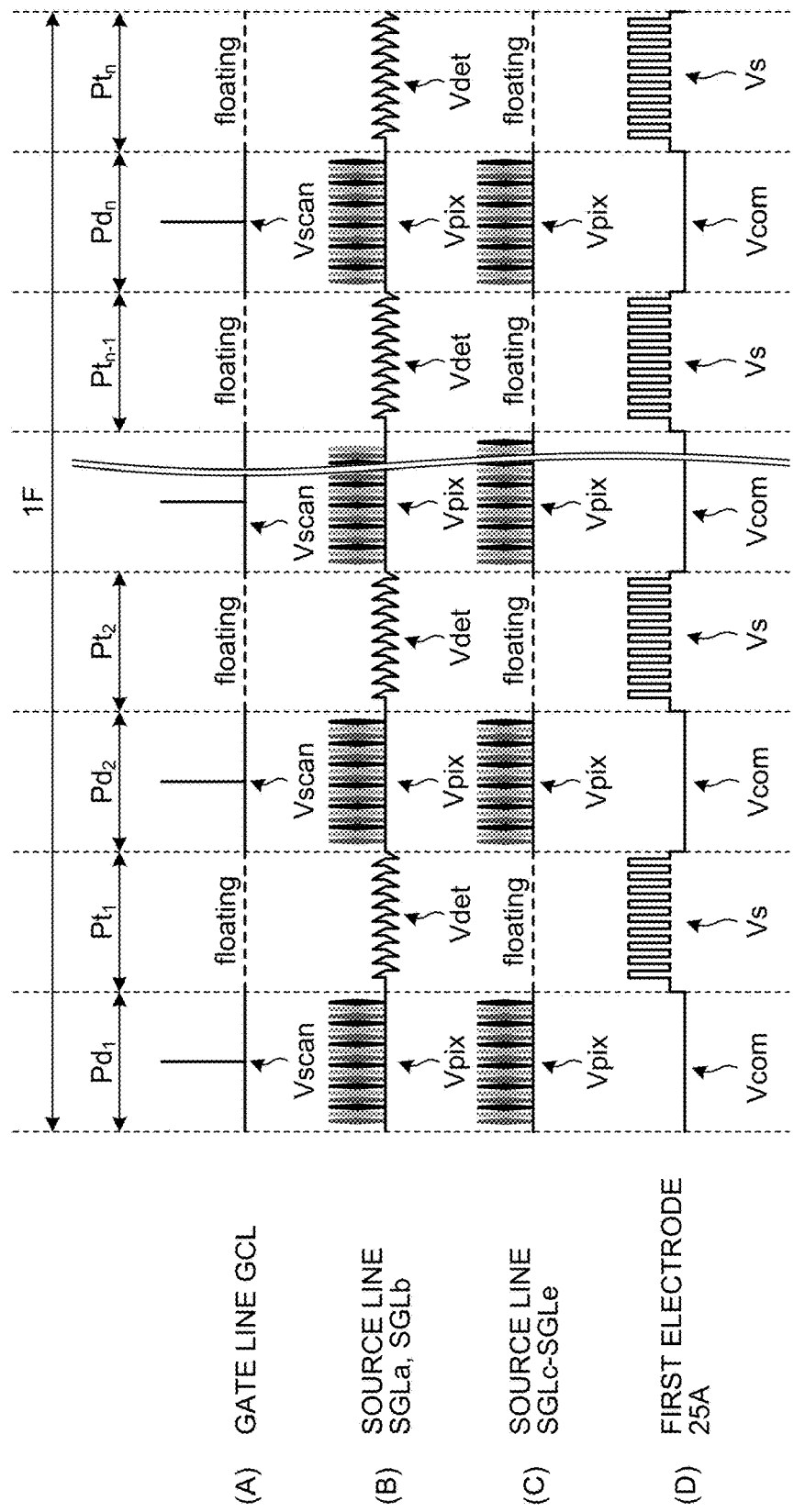
FIG. 17 is a timing waveform diagram of an exemplary operation performed by the display apparatus according to the second embodiment.

The following describes a display operation and a detection operation performed by the display apparatus 1A according to the present embodiment. FIG. 15 is a schematic circuit diagram for explaining coupling of the source lines to the detection controller in a display operation. FIG. 16 is a schematic circuit diagram for explaining coupling of the source lines to the detection controller in a detection operation. FIG. 17 is a timing waveform diagram of an exemplary operation performed by the display apparatus according to the second embodiment.

As illustrated in FIGS. 15 and 16, the source lines SGL are coupled to the source driver 13 and the detection controller 16 via a coupling switcher 13A. The coupling switcher 13A is supplied with control signals from the display controller 11 via a wire L1. The coupling switcher 13A is a circuit that switches the coupling state between the source lines SGL and the source driver 13 and between the source lines SGL and the detection controller 16 based on the control signals.

As illustrated in FIGS. 15 and 16, the source lines SGLa, SGLb, SGLc, SGLd, and SGLe can be coupled to the source driver 13 with switches SWa, SWb, SWc, SWd, and SWe, respectively, included in the coupling switcher 13A. The source lines SGLa and SGLb are also coupled to switches SWax and SWbx, respectively, provided in parallel with the switches SWa and SWb. The source lines SGLa and SGLb can be coupled to the detection controller 16 via the switches SWax and SWbx, respectively.

The switches SWax and SWbx are circuits turned on and off alternately with respect to the switches SWa and SWb, respectively. Specifically, let us assume a case where the same control signal is supplied to the switches SWa and SWb as well as the switches SWax and SWbx. In this case, if the switches SWa and SWb are turned on, the switches SWax and SWbx are turned off. If the switches SWa and SWb are turned off, the switches SWax and SWbx are turned on.

While only part of the source lines SGL are illustrated in FIGS. 15 and 16, the coupling switcher 13A is coupled to all the source lines SGL in the display area Ad. The coupling switcher 13A performs the same switching operation on each detection electrode block SGLB.

As illustrated in FIGS. 15 and 17, in the display periods Pd, the switches SWa, SWb, SWc, SWd, and SWe are turned on, and the source lines SGLa, SGLb, SGLc, SGLd, and SGLe are supplied with the pixel signals Vpix. The first electrode driver 14 supplies the display drive signals Vcom to the first electrodes 25A. By contrast, the switches SWax and SWbx are turned off, and coupling of the source lines SGLa and SGLb to the detection controller 16 is cut off. Consequently, the source lines SGLa and SGLb output no detection signal Vdet in the display periods Pd.

As illustrated in FIGS. 16 and 17, in the detection periods Pt, the switches SWa, SWb, SWc, SWd, and SWe are turned off, and coupling of the source lines SGLa, SGLb, SGLc, SGLd, and SGLe to the source driver 13 is cut off. By contrast, the switches SWax and SWbx are turned on, and the source lines SGLa and SGLb are coupled to the detection controller 16. The first electrode driver 14 supplies the detection drive signals Vs to the first electrodes 25A. The source lines SGLa and SGLb output, to the detection controller 16, the detection signals Vdet based on a change in the capacitance between the first electrodes 25A and the source lines SGLa, SGLb caused when the drive signals Vs are supplied.

At this time, neither the source line SGLc, SGLd, nor SGLe is coupled to the detection controller 16, and those are in the floating state. The gate lines GCL are also in the floating state. This configuration suppresses capacitive coupling of the first electrodes 25A to the source lines SGLc, SGLd, and SGLe and of the first electrodes 25A with respect to the gate lines GCL, thereby reducing stray capacitance. Consequently, the present embodiment can improve the detection performance.

As described above, the coupling state of the source lines SGL is switched between the display periods Pd and the detection periods Pt. With this configuration, the source lines SGL serve as the signal lines in the display periods Pd and as the detection electrodes in the detection periods Pt. The first electrodes 25A serve as the common electrodes in the display periods Pd and as the drive electrodes for the source lines SGL in the detection periods Pt. In the detection periods Pt, the coupling switcher 13A couples at least a target line of the source lines SGLa to SGLe to the detection controller 16 and sets at least a non-target line of the source lines SGLa to SGLe into the floating state. With this configuration, the present embodiment can perform a detection operation with appropriate resolution.

Third Embodiment

Figure 18:
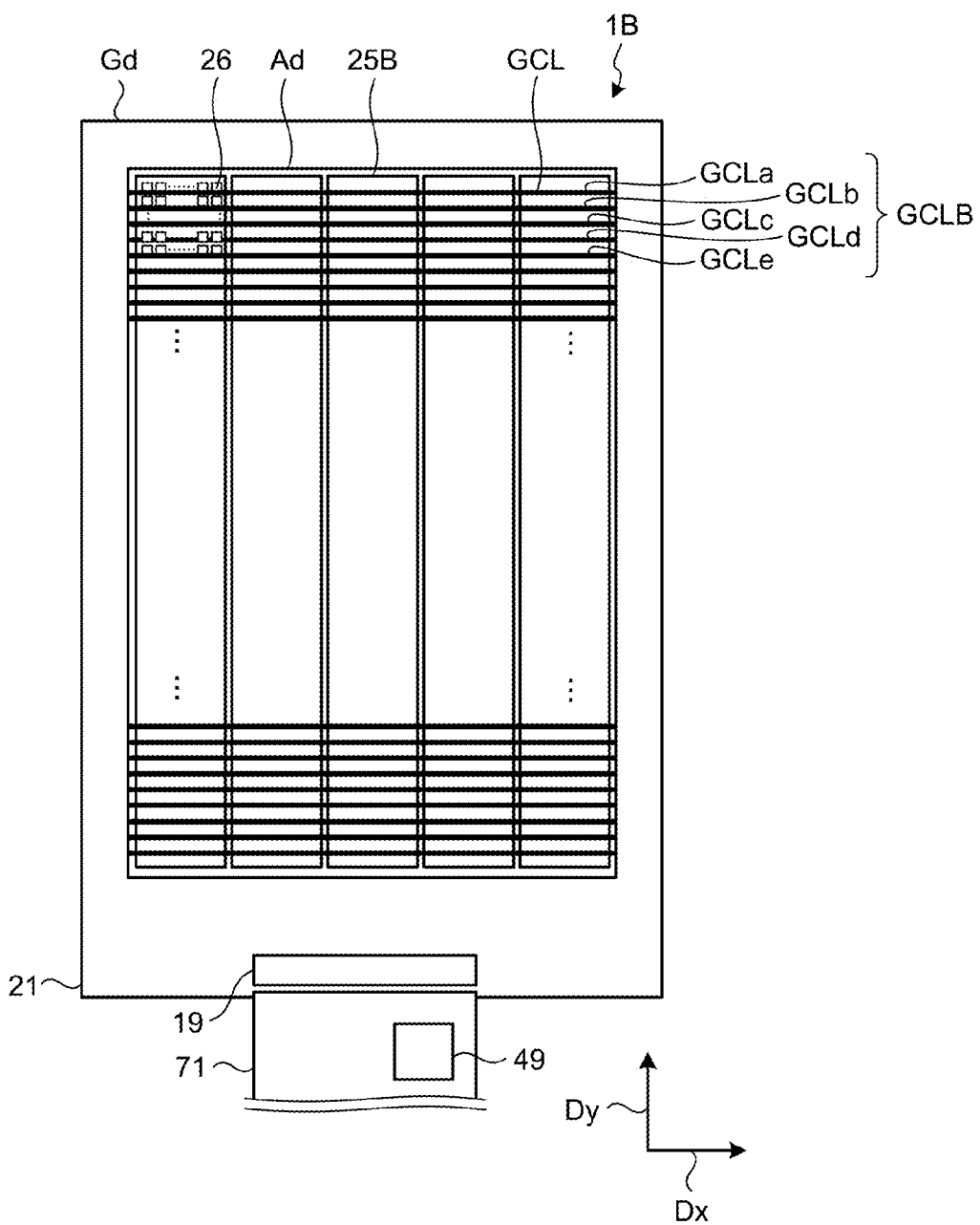
FIG. 18 is a plan view schematically illustrating the first basement of the display apparatus according to a third embodiment of the present invention.

FIG. 18 is a plan view schematically illustrating the first basement of the display apparatus according to a third embodiment of the present invention. In a display apparatus 1B according to the present embodiment, a first electrode 25B extends in the second direction Dy and a plurality of first electrodes 25B are arrayed in the first direction Dx. The gate line GCL extends in the direction intersecting with the extending direction of the first electrodes 25B and a plurality of gate lines GCL are arrayed in the extending direction of the first electrodes 25B. Capacitance is generated at the intersections of the first electrodes 25B and the gate lines GCL. The gate lines GCL output, to the detection controller 16, the detection signals Vdet based on a change in the capacitance between the first electrodes 25B and the gate lines GCL. In the display apparatus 1B according to the present embodiment, the gate lines GCL serve as the detection electrodes. The display apparatus 1B can detect an external object in contact with or in proximity to the display apparatus 1B based on the basic principle of mutual capacitance touch detection.

As illustrated in FIG. 18, the present embodiment can extract the detection signals Vdet from each detection electrode block GCLB including gate lines GCLa, GCLb, GCLc, GCLd, and GCLe. The present embodiment includes a coupling switcher having a configuration similar to that of the coupling switcher 13A illustrated in FIGS. 15 and 16, and thus the coupling switcher can switch the coupling state between the detection electrode blocks GCLB and the detection controller 16. In the detection periods Pt, for example, the coupling switcher couples at least a target line of the gate lines GCLa to GCLe to the detection controller 16. For example, the gate lines GCLa and GCLb output the detection signals Vdet to the detection controller 16. The coupling switcher does not couple at least a non-target line of the gate lines GCLa to GCLe to the detection controller 16 and sets the non-target line into the floating state.

The number of gate lines GCL included in one detection electrode block GCLB as well as the number and the combination of gate lines GCL coupled to the detection controller 16 in the detection electrode block GCLB may be appropriately modified. While the source lines SGL are not illustrated in FIG. 18, those are in the floating state in the detection periods Pt.

In the configuration according to the present embodiment, the gate lines GCL, the switching elements Tr and the source lines SGL, the first electrodes 25B, the second electrodes 26, and the liquid crystal layer 6 are disposed in this order from the second surface 21b of the first basement 21. In other words, the liquid crystal layer 6 is not provided between the first surface 21a serving as the detection surface in a detection operation and the gate lines GCL serving as the detection electrodes. This configuration suppresses a change in the capacitance between the first electrodes 25B and the gate lines GCL when the permittivity of the liquid crystal layer 6 changes because of a change in the orientation state of the liquid crystals in the liquid crystal layer 6, for example. Consequently, the display apparatus 1B according to the present embodiment can suppress noise in the detection operation and improve the detection performance.

While the display apparatus 1A according to the second embodiment and the display apparatus 1B according to the third embodiment use the first electrodes 25A and 25B, respectively, as the drive electrodes and use the gate lines GCL or the source lines SGL as the detection electrodes in a detection operation, the configuration is not limited thereto. The display apparatus 1A and the display apparatus 1B may use one of the gate lines GCL and the source lines SGL as the drive electrodes and use the other of the gate lines GCL and the source lines SGL as the detection electrodes. In other words, the first electrode driver 14 may supply the drive signals Vs to one of the gate lines GCL and the source lines SGL, and the other of the gate lines GCL and the source lines SGL may output, to the calculator 40, the detection signals Vdet based on a change in the capacitance between the gate lines GCL and the source lines SGL.

Fourth Embodiment

Figure 19:
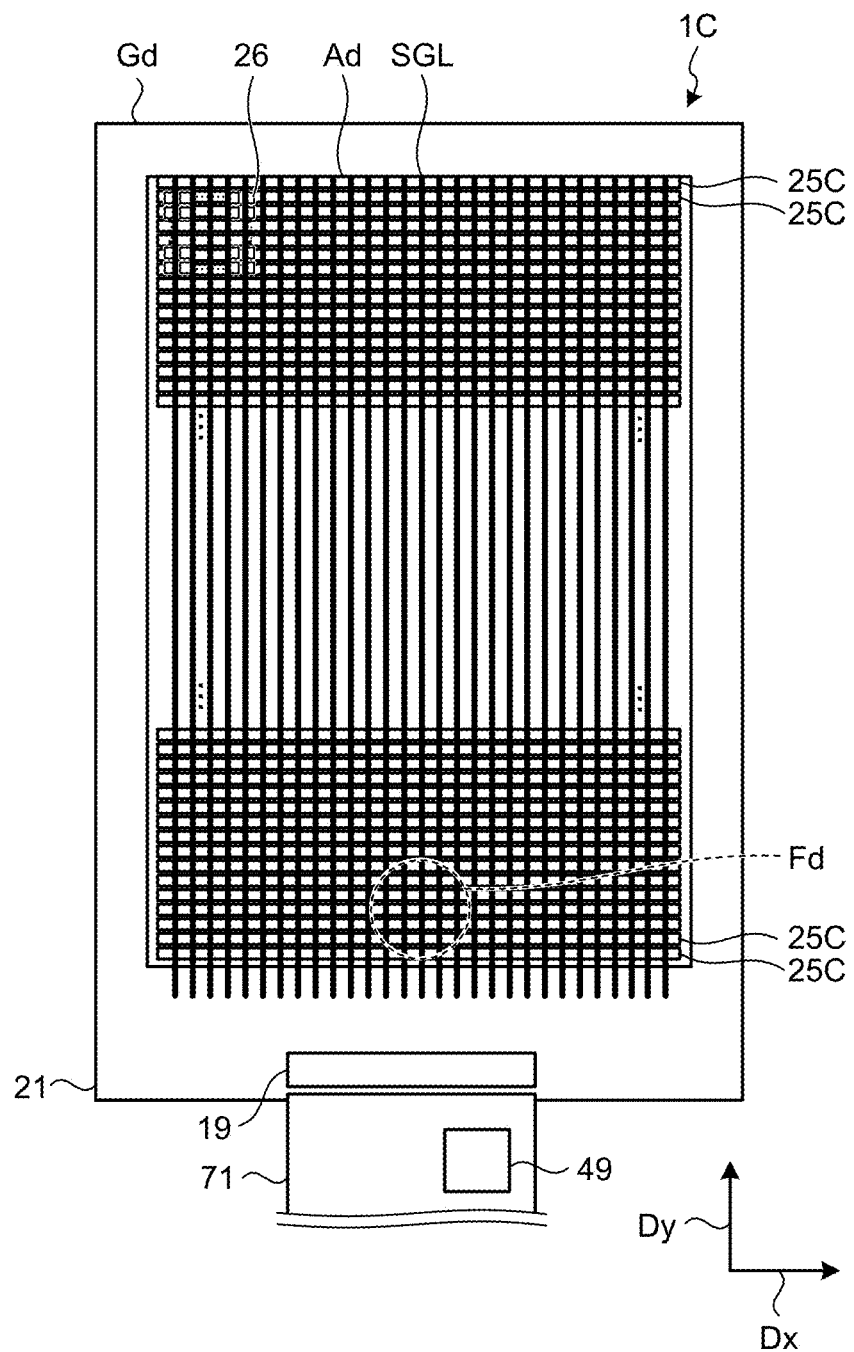
FIG. 19 is a plan view schematically illustrating the first basement of the display apparatus according to a fourth embodiment of the present invention.
Figure 20:
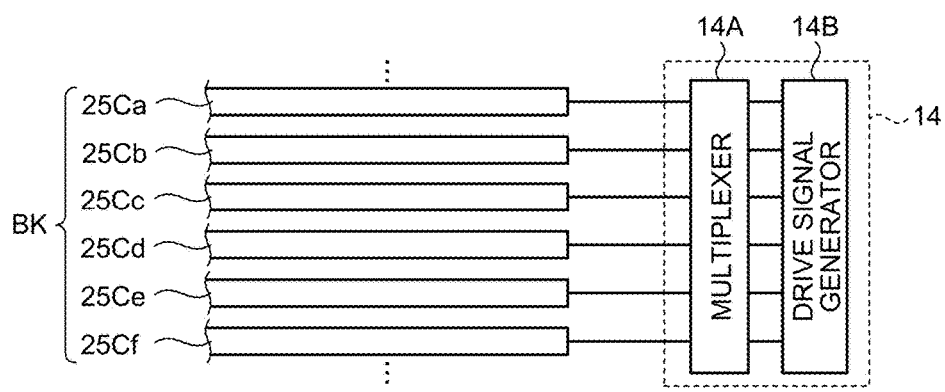
FIG. 20 is a diagram for schematically explaining an example of a method for driving the first electrodes according to the fourth embodiment.

FIG. 19 is a plan view schematically illustrating the first basement of the display apparatus according to a fourth embodiment of the present invention. FIG. 20 is a diagram for schematically explaining an example of a method for driving the first electrodes according to the fourth embodiment. In a display apparatus 1C according to the present embodiment, a first electrode 25C extends in a direction along the first direction Dx and a plurality of first electrodes 25C are arrayed in a direction along the second direction Dy. The source lines SGL serve as the detection electrodes in a detection operation. The display apparatus 1C can detect an external object in contact with or in proximity to the display apparatus 1C based on a change in the capacitance between the first electrodes 25C and the source lines SGL.

In the display apparatus 1C according to the present embodiment, the first electrodes 25C have a smaller width and are arrayed at a smaller array pitch than those of the first electrodes 25A (refer to FIG. 11) according to the second embodiment. The width of the first electrodes 25C is the length of the first electrodes 25C in the second direction Dy. As illustrated in FIG. 19, the width of the first electrodes 25C is substantially equal to that of the second electrodes 26 in the second direction Dy. The array pitch of the first electrodes 25C is substantially equal to that of the second electrodes 26 in the second direction Dy. In other words, the first electrodes 25C are more finely provided in correspondence with the sub-pixels SPix arrayed in the second direction Dy.

With this configuration, the display apparatus 1C according to the present embodiment can increase the resolution for touch detection. The display apparatus 1C thus can detect unevenness on the surface of an external object, such as a fingerprint, based on a change in the capacitance caused by the unevenness on the surface of a finger or the like in contact with or in proximity to the display apparatus 1C. Consequently, the display apparatus 1C according to the present embodiment can be used as a fingerprint detection apparatus, for example.

As illustrated in FIG. 20, the first electrode driver 14 includes a multiplexer 14A and a drive signal generator 14B. The multiplexer 14A is a circuit that switches the coupling state of the drive signal generator 14B to the first electrodes 25C. The multiplexer 14A can sequentially select a drive electrode block BK including a predetermined number of first electrodes 25C out of the first electrodes 25C. The drive signal generator 14B generates the detection drive signals Vs and supplies those to each drive electrode block BK via the multiplexer 14A. In the example illustrated in FIG. 20, one drive electrode block BK includes six first electrodes 25Ca, 25Cb, 25Cc, 25Cd, 25Ce, and 25Cf.

The display apparatus 1C according to the present embodiment has a first detection mode and a second detection mode. In the first detection mode, the display apparatus 1C detects the position of an external object in contact with or in proximity to the detection surface (first surface 21a of the first basement 21). In the second detection mode, the display apparatus 1C detects unevenness on the surface of a finger or the like. In the first detection mode, the first electrode driver 14 supplies the drive signals Vs to each drive electrode block BK and collectively drives the predetermined number of first electrodes 25C, thereby performing a detection operation on the whole detection surface. If an external object is detected in an area Fd surrounded by the dotted line in FIG. 19 in the first detection mode, for example, the display apparatus 1C performs a detection operation in the second detection mode. The display apparatus 1C individually drives the first electrodes 25C corresponding to the area Fd and increases the resolution for detection, thereby detecting unevenness on the surface of a finger or the like.

Figure 21:
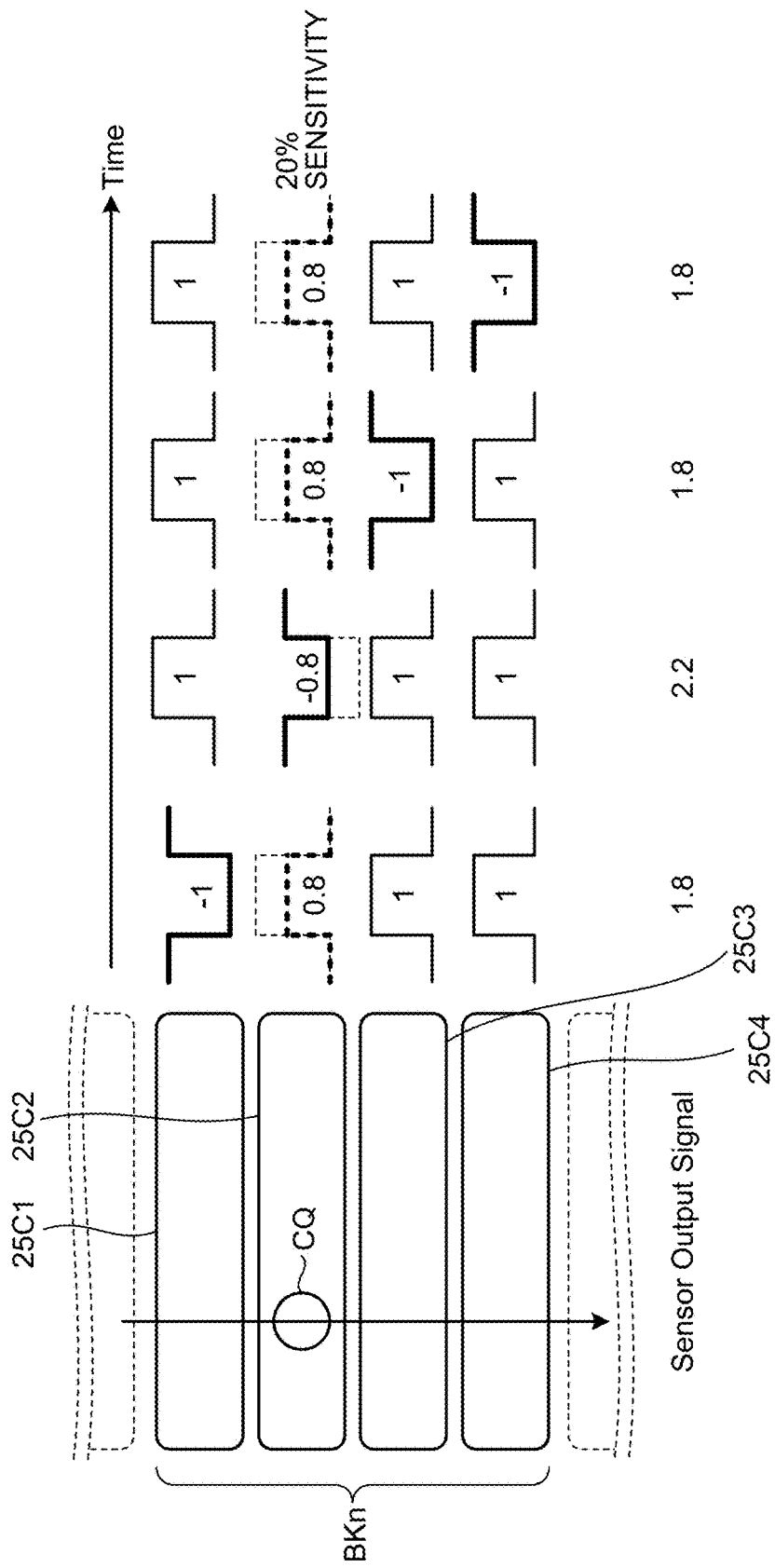
FIG. 21 is a diagram for explaining an example of an operation in code division multiplex drive.

FIG. 21 is a diagram for explaining an example of an operation in code division multiplex drive. As illustrated in FIG. 21, the first electrode driver 14 of the display apparatus 1C simultaneously selects a plurality of (four in the example in FIG. 21) first electrodes 25C1, 25C2, 25C3, and 25C4 in a drive electrode block Bkn. The first electrode driver 14 supplies the drive signals Vs having a phase determined based on a predetermined code to the first electrodes 25C1, 25C2, 25C3, and 25C4. In FIG. 21, the waveforms illustrated on the right side of the first electrodes 25C1, 25C2, 25C3, and 25C4 indicate an example of the phases of the drive signals Vs.

The predetermined code is defined by the square matrix in Expression (1). The order of the square matrix in Expression (1) corresponds to the number of first electrodes 25C1, 25C2, 25C3, and 25C4 in the drive electrode block Bkn, that is, 4. A diagonal component "−1" in the square matrix in Expression (1) is different from a component "1" other than the diagonal component in the square matrix. The component "−1" is a code for supplying the drive signals Vs determined so as to have a phase different from that of the component "1". The first electrode driver 14, for example, applies the drive signals Vs such that the phase of the AC rectangular wave Sg corresponding to the component "1" other than the diagonal component in the square matrix is opposite to that of the AC rectangular wave Sg corresponding to the diagonal component "−1" in the square matrix based on the square matrix in Expression (1).

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \begin{pmatrix} 1.8 \\ 2.2 \\ 1.8 \\ 1.8 \end{pmatrix} = \begin{pmatrix} 4.0 \\ 3.2 \\ 4.0 \\ 4.0 \end{pmatrix} \quad (1)$$

To use a plurality of first electrodes 25C simultaneously like in the drive electrode block Bkn described above, the detection device 30 performs detection by a code division multiplex (CDM) method.

Let us assume a case where an external object CQ, such as a finger, is present on the first electrode 25C2 at the second position from the scanning upstream out of the first electrodes 25C1, 25C2, 25C3, and 25C4 in the drive electrode block Bkn, for example. In this case, a voltage of difference caused by the external object CQ is generated by mutual induction (the voltage of difference is 20%, for example). In this example, the detection signal Vdet detected by the detection device 30 at the first timing (first period of time) is expressed by (−1)+(0.8)+(1)+(1)=1.8. "1.8" indicates the signal strength based on the signal strength of the drive signal Vs of the component "1". The detection signal Vdet detected by the detection device 30 at the timing (second period of time) subsequent to the first period of time is expressed by (1)+(−0.8)+(1)+(1)=2.2. The detection signal Vdet detected by the detection device 30 at the timing (third period of time) subsequent to the second period of time is expressed by (1)+(0.8)+(−1)+(1)=1.8. The detection signal Vdet detected by the detection device 30 at the timing (fourth period of time) subsequent to the third period of time is expressed by (1)+(0.8)+(1)+(−1)=1.8.

The coordinate extractor 45 multiplies the detection signals Vdet detected by the signal operator 44 by the square matrix in Expression (1). The display apparatus 1C thus detects the external object CQ, such as a finger, present at the position of the first electrode 25C2 in the drive electrode block Bkn with detection sensitivity higher than (e.g., four times) the detection sensitivity in time division multiplex (TDM) drive without increasing the voltage of signals output as the drive signals Vs.

By performing the detection operation by the CDM method, the display apparatus 1C can increase the detection sensitivity in the second detection mode, thereby detecting a fingerprint accurately. In addition, the display apparatus 1C can complete the touch detection in the second detection mode in a shorter time. Because the first electrodes 25C are arrayed at a smaller array pitch, the signal strength of the detection signals Vdet output from the respective first electrodes 25C when the drive signals Vs are supplied may possibly be reduced. The employment of the CDM method in the second detection mode facilitates the securement of sufficient sensitivity.

While the drive electrode block Bkn includes the four first electrodes 25C1, 25C2, 25C3, and 25C4 in the description with reference to FIG. 21 and Expression (1), the configuration is not limited thereto. The number of first electrodes 25C included in the drive electrode block Bkn may be appropriately modified (e.g., 128).

Fifth Embodiment

Figure 22:
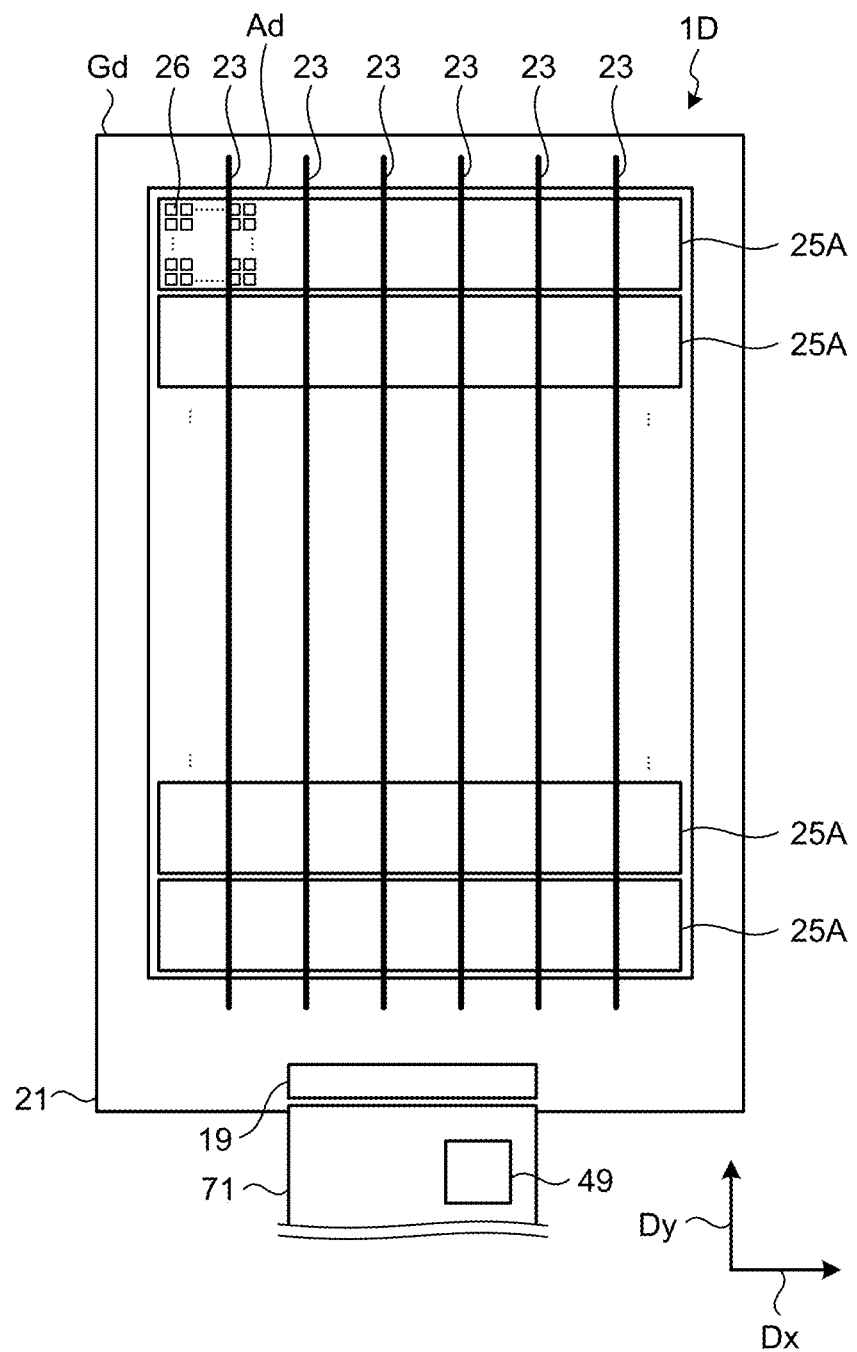
FIG. 22 is a plan view schematically illustrating the first basement of the display apparatus according to a fifth embodiment of the present invention.
Figure 23:
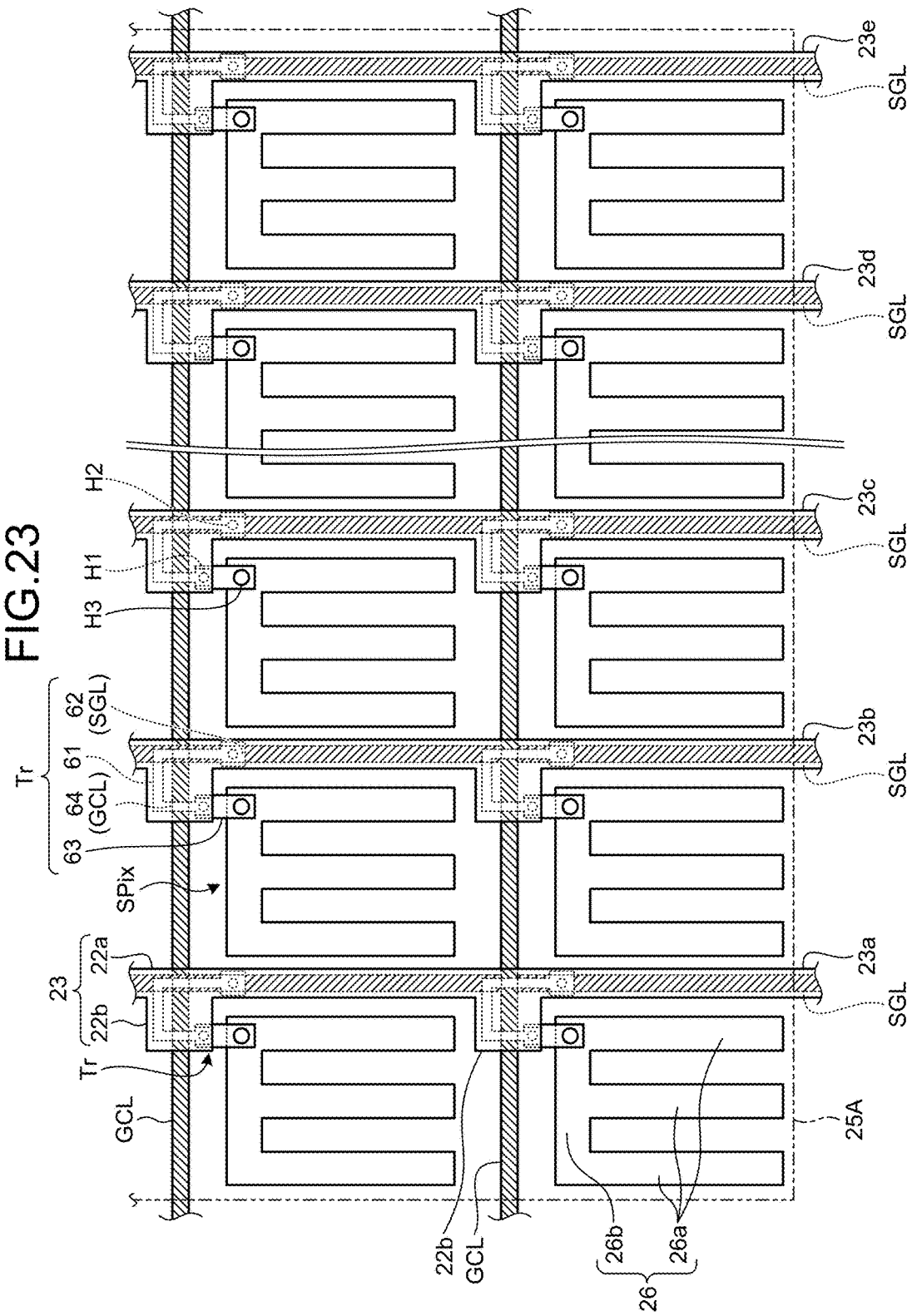
FIG. 23 is a schematic plan view of the relation in an array of the first electrodes, the second electrodes, and light-shielding layers according to the fifth embodiment.
Figure 24:
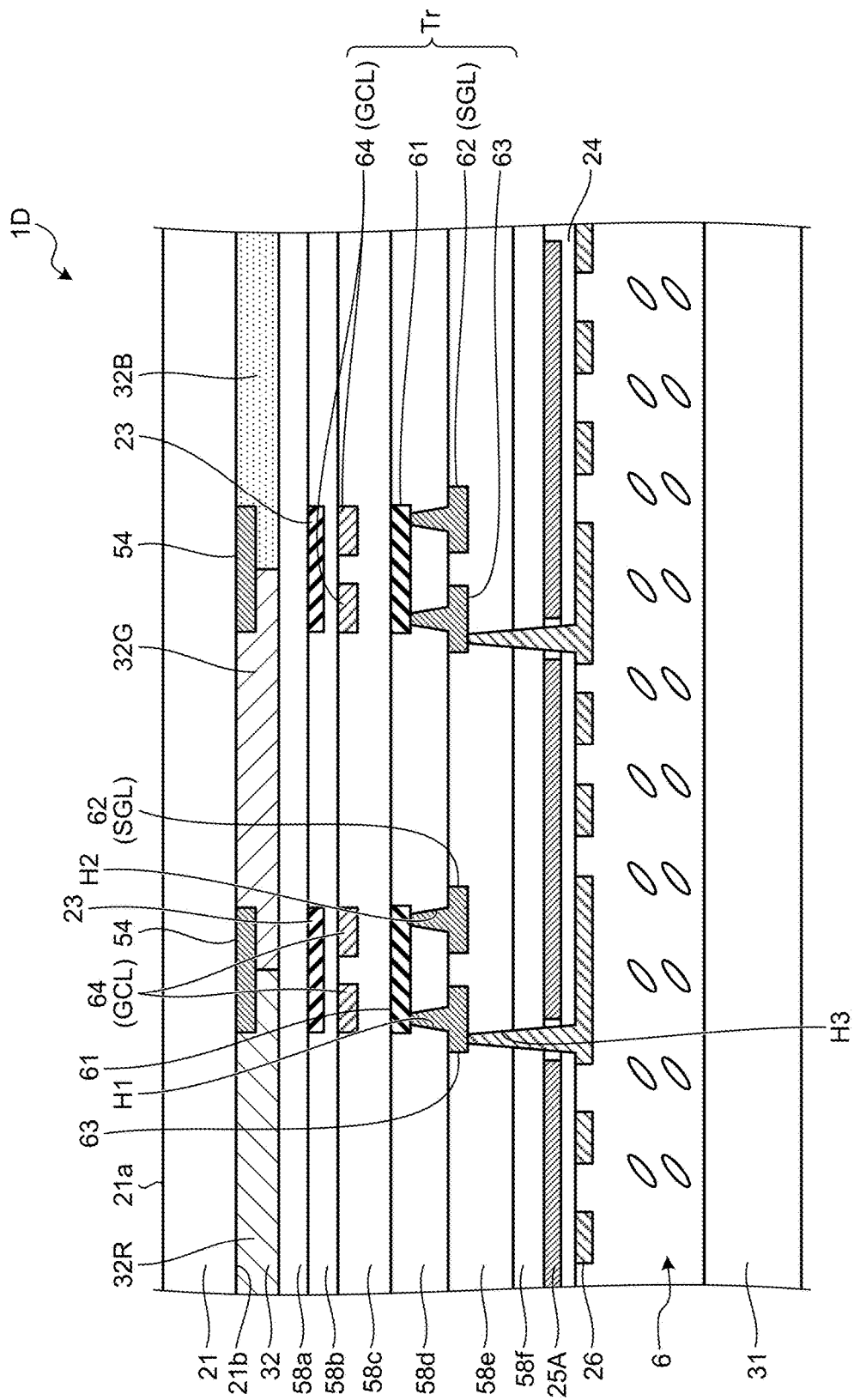
FIG. 24 is a schematic sectional view for explaining the relation among the first electrodes, the second electrodes, the switching elements, and the light-shielding layers according to the fifth embodiment.
Figure 25:
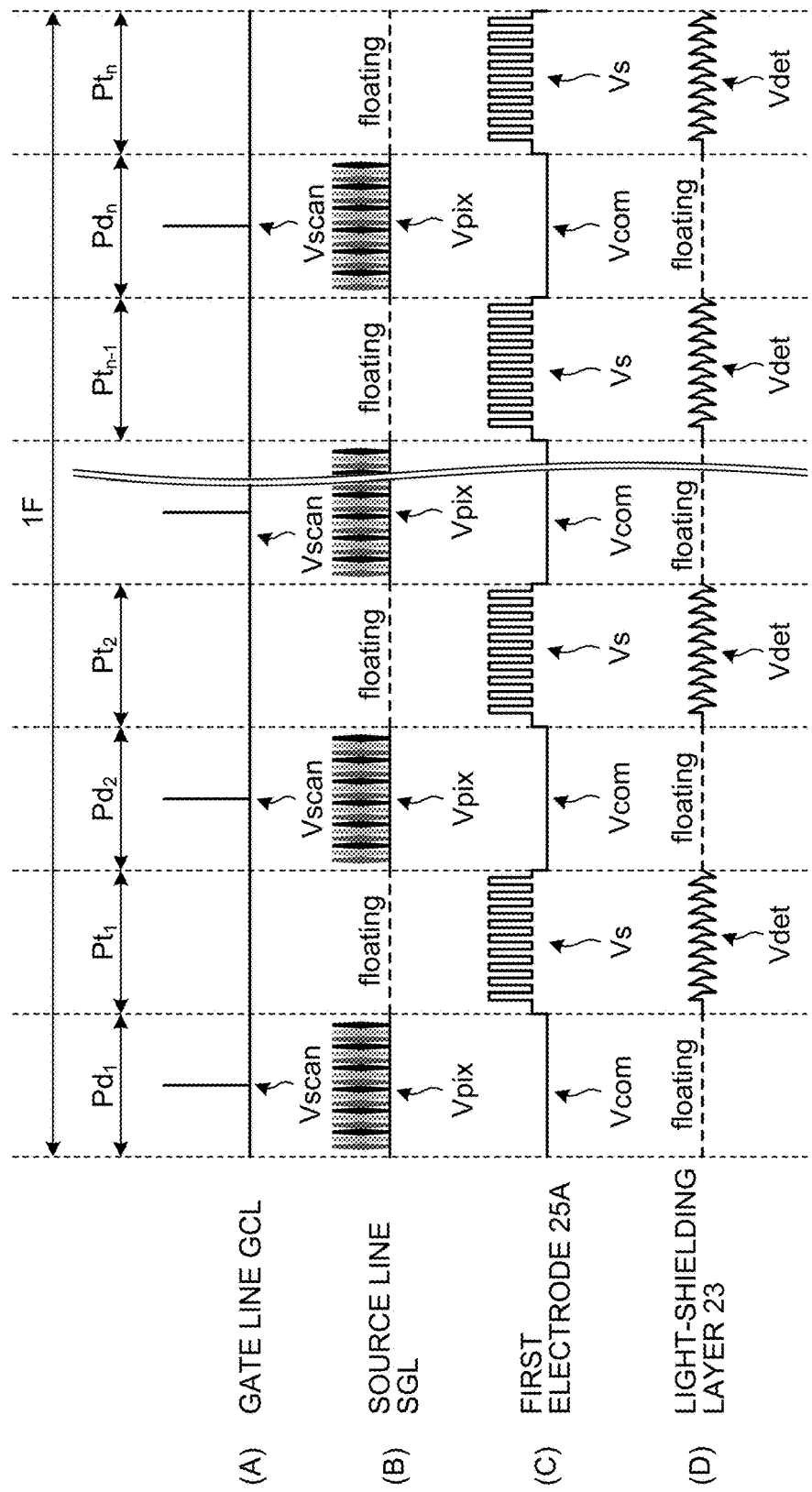
FIG. 25 is a timing waveform diagram of an exemplary operation performed by the display apparatus according to the fifth embodiment.

FIG. 22 is a plan view schematically illustrating the first basement of the display apparatus according to a fifth embodiment of the present invention. FIG. 23 is a schematic plan view of the relation in an array of the first electrodes, the second electrodes, and light-shielding layers according to the fifth embodiment. FIG. 24 is a schematic sectional view for explaining the relation among the first electrodes, the second electrodes, the switching elements, and the light-shielding layers according to the fifth embodiment. FIG. 25 is a timing waveform diagram of an exemplary operation performed by the display apparatus according to the fifth embodiment. FIG. 23 is a plan view viewed from the first surface 21a side.

As illustrated in FIG. 22, the first basement 21 of a display apparatus 1D according to the present embodiment includes the first electrodes 25A, the second electrodes 26, and light-shielding layers 23. Similarly to the second embodiment, the first electrode 25A extends in the first direction Dx and a plurality of first electrodes 25A are arrayed in the second direction Dy. The light-shielding layer 23 extends in the second direction Dy and a plurality of light-shielding layers 23 are arrayed in the first direction Dx. The light-shielding layers 23 are provided in a manner intersecting with the first electrodes 25A. Capacitance is generated at the intersections of the first electrodes 25A and the light-shielding layers 23. The light-shielding layers 23 according to the present embodiment serve as the detection electrodes in a detection operation and output, to the detection controller 16, the detection signals Vdet based on a change in the capacitance between the first electrodes 25A and the light-shielding layers 23.

As illustrated in FIG. 23, the light-shielding layers 23 have a first portion 22a and a second portion 22b. The first portion 22a is provided at the position overlapping with the source line SGL and extends in a direction along the extending direction of the source line SGL. The second portion 22b protrudes from the first portion 22a in the extending direction of the gate line GCL at the intersection of the source line SGL and the gate line GCL and overlaps with the semiconductor layer 61 of the switching element Tr.

The light-shielding layers 23 are provided in a manner overlapping with the respective source lines SGL. In a detection operation, the display apparatus 1D may perform the detection operation on each detection electrode block using light-shielding layers 23a, 23b, 23c, 23d, and 23e illustrated in FIG. 23 as one detection electrode block. Similarly to the examples illustrated in FIGS. 15 and 16, the light-shielding layers 23a and 23b in one detection electrode block are coupled to the detection controller 16 and output the detection signals Vdet to the detection controller 16, for example. Neither the light-shielding layer 23c, 23d, nor 23e is coupled to the detection controller 16, and those are in the floating state.

As illustrated in FIG. 24, the light-shielding layer 23 is provided on the lower side of the color filter 32 with the planarization layer 58a interposed therebetween. The gate electrodes 64 are provided on the lower side of the light-shielding layer 23 with the insulating layer 58b interposed therebetween. The semiconductor layer 61 is provided on the lower side of the gate electrodes 64 with the insulating layer 58c interposed therebetween. The source electrode 62 and the drain electrode 63 are provided on the lower side of the semiconductor layer 61 with the insulating layer 58d interposed therebetween.

The first electrode 25A is provided on the lower side of the source electrode 62 and the drain electrode 63 with the insulating layers 58e and 58f interposed therebetween. The second electrode 26 is provided on the lower side of the first electrode 25A with the insulating layer 24 interposed therebetween. The second electrode 26 is electrically coupled to the drain electrode 63 through the contact hole H3. The liquid crystal layer 6 is provided between the first electrode 25A and the second basement 31.

With this configuration, the light-shielding layers 23, the gate lines GCL, the source lines SGL, the first electrodes 25A, and the second electrodes 26 are disposed in this order from the first basement 21 to the liquid crystal layer 6 serving as the display functional layer. In other words, the liquid crystal layer 6 is not provided between the first surface 21a serving as the detection surface in a detection operation and the light-shielding layers 23 serving as the detection electrodes. This configuration suppresses a change in the capacitance between the first electrodes 25A and the light-shielding layers 23 when the permittivity of the liquid crystal layer 6 changes because of a change in the orientation state of the liquid crystals in the liquid crystal layer 6, for example. Consequently, the display apparatus 1D according to the present embodiment can suppress noise in the detection operation and improve the detection performance.

The light-shielding layers 23 are made of a light-shielding conductive material, such as at least one metal material out of Al, Cu, Ag, Mo, and an alloy of these metals. The light-shielding layers 23 may be a multilayered body having a plurality of layers made of one or more of the metal materials described above. Alternatively, the light-shielding layers 23 may be made of a translucent conductive material, such as ITO.

The light-shielding layers 23 have light transmittance lower than that of the first basement 21. In a case where the light-shielding layers 23 are made of a metal material, light does not substantially pass through the light-shielding layers 23. The light-shielding layers 23 are provided to block light entering into the semiconductor layer 61. This configuration suppresses a leakage current from the switching elements Tr, thereby suppressing malfunction.

While the first portion 22a and the second portion 22b of the light-shielding layers 23 wholly cover the respective semiconductor layers 61 in FIG. 23, the configuration is not limited thereto. The second portion 22b, for example, may cover only part of the semiconductor layer 61. Alternatively, the light-shielding layers 23 do not necessarily have the second portion 22b and may have only the first portion 22a.

As illustrated in FIG. 25, in the display periods Pd, the display controller 11 supplies the scanning signals Vscan to the gate lines GCL via the gate driver 12. The display controller 11 supplies the pixel signals Vpix to the source lines SGL via the source driver 13. The first electrodes 25A also serve as the common electrodes for the display panel 20. In the display periods Pd, the first electrode driver 14 supplies the drive signals Vcom serving as a common potential for display to selected first electrodes 25A. In the display periods Pd, the light-shielding layers 23 are not coupled to the detection controller 16 and are in the floating state.

In the detection periods Pt, the detection controller 16 supplies the detection drive signals Vs from the first electrode driver 14 to the first electrodes 25A. Based on the basic principle of mutual capacitance touch detection described above, the light-shielding layers 23 output, to the calculator 40, the detection signals Vdet based on a change in the capacitance between the first electrodes 25A and the light-shielding layers 23. FIG. 25 illustrates the light-shielding layers 23 selected as a target of detection in the detection electrode block. The light-shielding layers 23 not selected as the target of detection in the detection electrode block are in the floating state and output no detection signal Vdet.

In the detection periods Pt, the detection controller 16 can set at least one of the gate lines GCL and the source lines SGL into the floating state. While the source lines SGL are in the floating state in the example illustrated in FIG. 25, the detection controller 16 may set both of the gate lines GCL and the source lines SGL into the floating state.

As described above, in the display apparatus 1D according to the present embodiment, the light-shielding layers 23 serve as the detection electrodes in a detection operation. This configuration does not require additional detection electrodes in another layer, thereby making the display apparatus 1D thinner.

Sixth Embodiment

Figure 26:
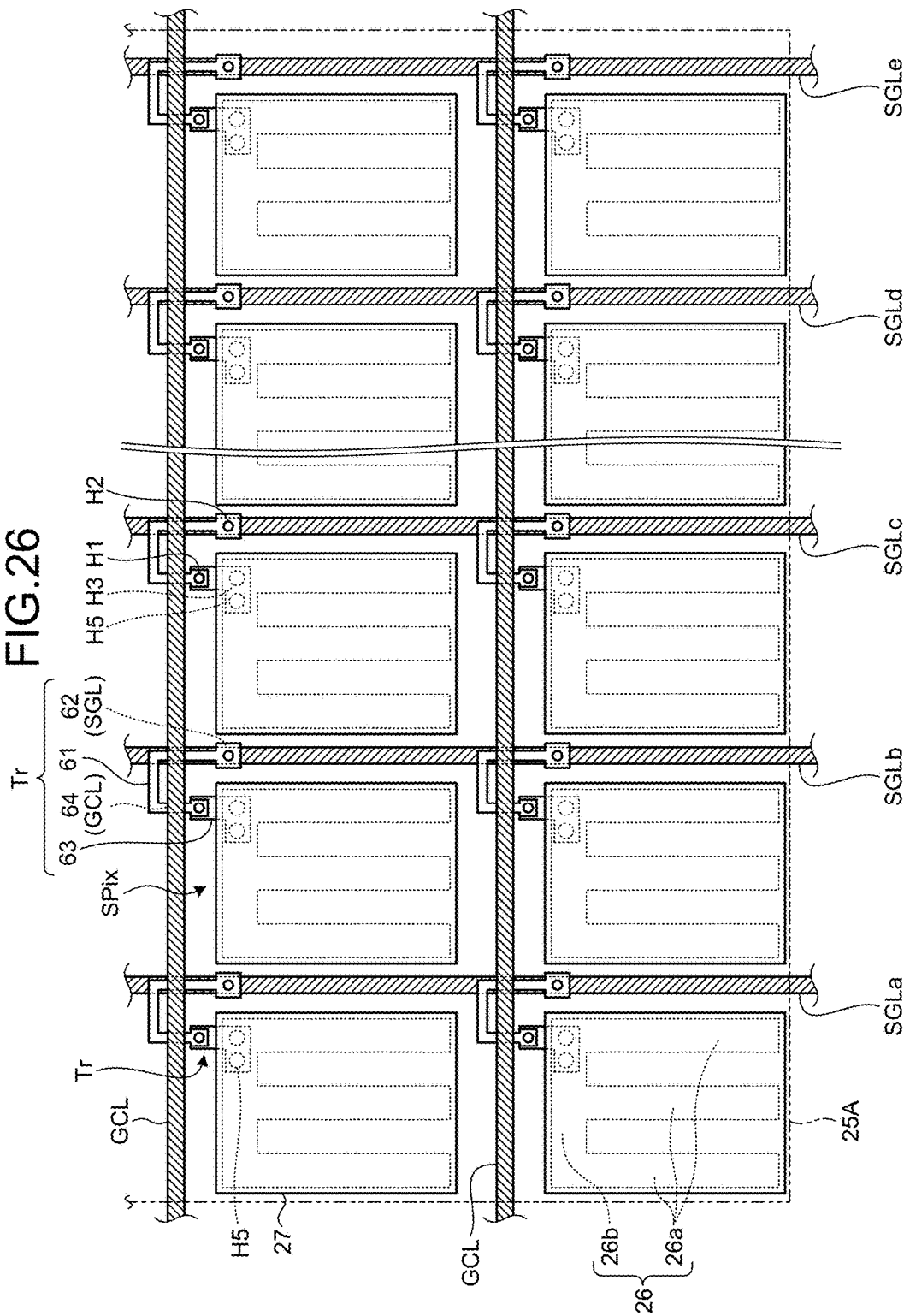
FIG. 26 is a schematic plan view of the relation in an array of the first electrodes, the second electrodes, and third electrodes according to a sixth embodiment of the present invention.
Figure 27:
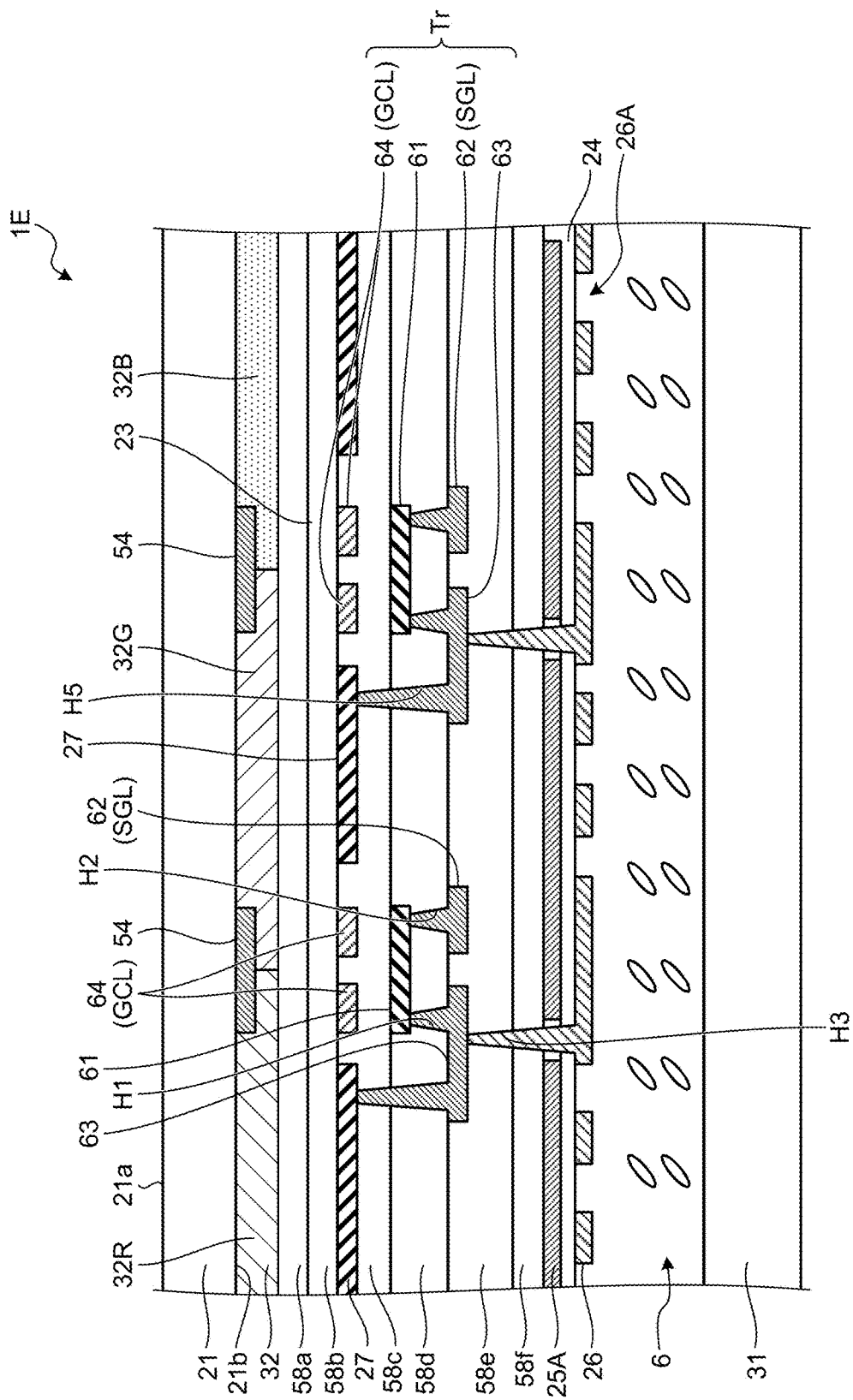
FIG. 27 is a schematic sectional view for explaining the relation among the first electrodes, the second electrodes, the switching elements, and the third electrodes according to the sixth embodiment.

FIG. 26 is a schematic plan view of the relation in an array of the first electrodes, the second electrodes, and third electrodes according to a sixth embodiment of the present invention. FIG. 27 is a schematic sectional view for explaining the relation among the first electrodes, the second electrodes, the switching elements, and the third electrodes according to the sixth embodiment. FIG. 26 is a plan view viewed from the first surface 21a side.

As illustrated in FIGS. 26 and 27, a display apparatus 1E according to the present embodiment includes the first electrodes 25A, the second electrodes 26, and third electrodes 27. The configuration of the first electrodes 25A, the second electrodes 26, and the source lines SGL is the same as that according to the second embodiment illustrated in FIG. 11. In other words, the display apparatus 1E according to the present embodiment can detect an external object in contact with or in proximity to the display apparatus 1E based on a change in the capacitance between the first electrodes 25A and the source lines SGL.

The third electrodes 27 according to the present embodiment serve as detection electrodes to detect unevenness on the surface of a finger or the like in contact with or in proximity to the first surface 21a of the first basement 21. As illustrated in FIG. 26, the third electrodes 27 have a substantially rectangular planar shape. The third electrodes 27 are arranged at the positions overlapping with the respective second electrodes 26 and arrayed in a matrix (row-column configuration) in correspondence with the second electrodes 26. In other words, the third electrodes 27 are arrayed at a pitch substantially equal to the array pitch of the sub-pixels SPix. The third electrodes 27 are provided to the areas surrounded by the gate lines GCL and the source lines SGL and wholly cover the respective second electrodes 26. In other words, the third electrodes 27 cover the strip-like electrodes 26a and the connection 26b of the respective second electrodes 26 and portions corresponding to the gaps between the adjacent strip-like electrodes 26a.

As illustrated in FIG. 27, each of the third electrodes 27 is provided on the lower side of the color filter 32 with the planarization layer 58a and the insulating layer 58b interposed therebetween. The third electrode 27 is arranged in the same layer as that of the gate electrodes 64 (gate lines GCL). The third electrode 27 is coupled to the drain electrode 63 of the switching element Tr through a contact hole H5. The second electrode 26 is also coupled to the drain electrode 63 of the switching element Tr through the contact hole H3. In other words, in the example illustrated in FIGS. 26 and 27, the second electrode 26 and the third electrode 27 are coupled to the same switching element Tr.

The first electrode driver 14 supplies fingerprint detection drive signals Vsa to the third electrodes 27 via the source lines SGL. The third electrodes 27 output, to the detection controller 16, the detection signals Vdet based on a change in the capacitance caused by unevenness on the surface of a finger or the like in contact with or in proximity to the display apparatus 1E. The display apparatus 1E according to the present embodiment can detect unevenness on the surface of a finger or the like in contact with or in proximity to the display apparatus 1E based on the basic principle of self-capacitance touch detection.

As described above, the display apparatus 1E according to the present embodiment has the following two detection modes: the first detection mode for detecting the position of an external object in contact with or in proximity to the detection surface (first surface 21a of the first basement 21) and the second detection mode for detecting unevenness on the surface of a finger or the like. In the first detection mode, the display apparatus 1E detects the position of an external object in contact with or in proximity to the detection surface based on a change in the capacitance between the first electrodes 25A and the source lines SGL. In the second detection mode, the display apparatus 1E detects unevenness on the surface of a finger or the like in contact with or in proximity to the detection surface based on a change in the capacitance of the third electrodes 27.

The third electrodes 27 are coupled to the respective switching elements Tr. With this configuration, the display apparatus 1E can select third electrodes 27 corresponding to a predetermined area (e.g., the area Fd illustrated in FIG. 19) from the third electrodes 27 as a target of detection to perform detection in the second detection mode. Let us assume a case where the display apparatus 1E performs a detection operation in the first detection mode, thereby detecting the position of an external object in the area Fd, for example. In this case, the gate driver 12 selects the third electrodes 27 corresponding to the area Fd, and the display apparatus 1E performs a detection operation in the second detection mode. The first electrode driver 14 supplies the drive signals Vsa to the third electrodes 27 corresponding to the area Fd via the source lines SGL. The display apparatus 1E thus can detect unevenness on the surface of a finger or the like in contact with or in proximity to the area Fd.

Figure 28:
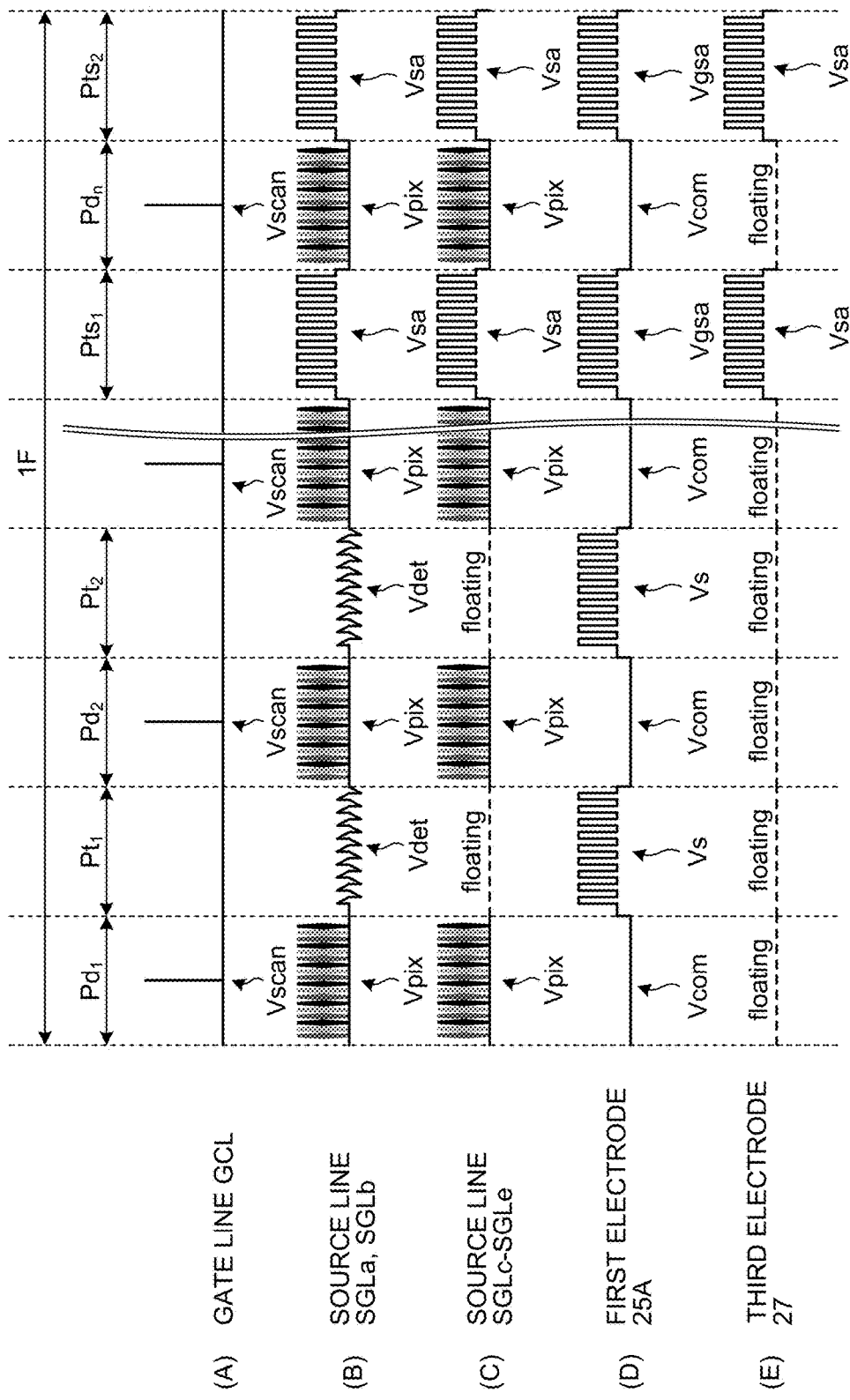
FIG. 28 is a timing waveform diagram of an exemplary operation performed by the display apparatus according to the sixth embodiment.

FIG. 28 is a timing waveform diagram of an exemplary operation performed by the display apparatus according to the sixth embodiment. As illustrated in FIG. 28, in the display periods Pd, the switches SWa, SWb, SWc, SWd, and SWe are turned on (refer to FIG. 15), and the source lines SGLa, SGLb, SGLc, SGLd, and SGLe are supplied with the pixel signals Vpix. The first electrode driver 14 supplies the display drive signals Vcom to the first electrodes 25A. By contrast, the switches SWax and SWbx are turned off (refer to FIG. 15), and coupling of the source lines SGLa and SGLb to the detection controller 16 is cut off. Consequently, the source lines SGLa and SGLb output no detection signal Vdet in the display period Pd.

The third electrodes 27 are coupled to the respective drain electrodes 63. When the gate driver 12 supplies the scanning signals Vscan to the switching elements Tr, the pixel signals Vpix are supplied via the source lines SGLa, SGLb, SGLc, SGLd, and SGLe. The third electrodes 27 are provided on the side opposite to the second electrodes 26 and the liquid crystal layer 6 across the first electrodes 25A serving as the common electrodes. This configuration suppresses deterioration in the display quality of a displayed image caused by the electric potential of the third electrodes 27.

As illustrated in FIG. 28, the display apparatus 1E performs a detection operation in the first detection mode in the detection periods Pt and performs a detection operation in the second detection mode in detection periods Pts. While the detection periods Pt in the first detection mode and the detection periods Pts in the second detection mode are included in one frame period (1F) in the example illustrated in FIG. 28, the present invention is not limited thereto. The detection controller 16, for example, may perform the detection operation in the first detection mode in one frame period (1F). If the position of an external object in contact with or in proximity to the display apparatus 1E is detected, the detection controller 16 may perform the detection operation in the second detection mode in the next frame period (1F).

In the detection periods Pt, the switches SWa, SWb, SWc, SWd, and SWe (refer to FIG. 16) are turned off, and coupling of the source lines SGLa, SGLb, SGLc, SGLd, and SGLe to the source driver 13 is cut off. By contrast, the switches SWax and SWbx (refer to FIG. 16) are turned on, and the source lines SGLa and SGLb are coupled to the detection controller 16. The first electrode driver 14 supplies the detection drive signals Vs to the first electrodes 25A. The source lines SGLa and SGLb output, to the detection controller 16, the detection signals Vdet based on a change in the capacitance between the first electrodes 25A and the source lines SGLa and SGLb caused when the drive signals Vs are supplied.

At this time, neither the source line SGLc, SGLd, nor SGLe is coupled to the detection controller 16, and those are in the floating state. The gate lines GCL are also in the floating state. This configuration suppresses capacitive coupling of the first electrodes 25A with respect to the source lines SGLc, SGLd, and SGLe and of the first electrodes 25A with respect to the gate lines GCL, thereby reducing stray capacitance. Consequently, the present embodiment can improve the detection performance.

In the detection periods Pts, the gate driver 12 supplies the scanning signals Vscan to the gate lines GCL corresponding to a detection target area. As a result, the third electrodes 27 corresponding to the detection target area are selected. The first electrode driver 14 supplies the fingerprint detection drive signals Vsa to the selected third electrodes 27 via the source lines SGLa, SGLb, SGLc, SGLd, and SGLe. The third electrodes 27 output, to the detection controller 16, the detection signals Vdet based on a change in the capacitance of the third electrodes 27 via the source lines SGLa, SGLb, SGLc, SGLd, and SGLe.

In the detection periods Pts, the guard electrode driver 17 (refer to FIG. 1) supplies guard signals Vgsa to the first electrodes 25A. The guard signals Vgsa are voltage signals synchronized with and having the same waveform as that of the fingerprint detection drive signals Vsa. With this configuration, the first electrodes 25A are driven at the same electric potential as that of the third electrodes 27, thereby suppressing capacitive coupling of the first electrodes 25A with respect to the third electrodes 27. In other words, the first electrodes 25A serve as the guard electrodes for the third electrodes 27. On the first electrodes 25A side with respect to the third electrodes 27, when an external object is in contact with or in proximity to the display apparatus 1E, this configuration suppresses a change in the capacitance of the third electrodes 27 caused when the drive signals Vsa are supplied thereto. Consequently, the present embodiment can suppress reduction in the detection sensitivity in the detection operation in the second detection mode.

As described above, the third electrodes 27, the first electrodes 25A, and the second electrodes 26 according to the present embodiment are disposed in this order from the first basement 21 to the liquid crystal layer 6 serving as the display functional layer. In other words, the liquid crystal layer 6 is not provided between the first surface 21a serving as the detection surface in a detection operation and the third electrodes 27 serving as the detection electrodes for detecting a fingerprint. This configuration suppresses a change in the capacitance of the third electrodes 27 when the permittivity of the liquid crystal layer 6 changes because of a change in the orientation state of the liquid crystals in the liquid crystal layer 6, for example. The third electrodes 27 are provided to the layer closer to the first basement 21 than the first electrodes 25A and the second substrates 26. Consequently, the display apparatus 1E according to the present embodiment can suppress noise in the detection operation and detect a fingerprint accurately.

Seventh Embodiment

Figure 29:
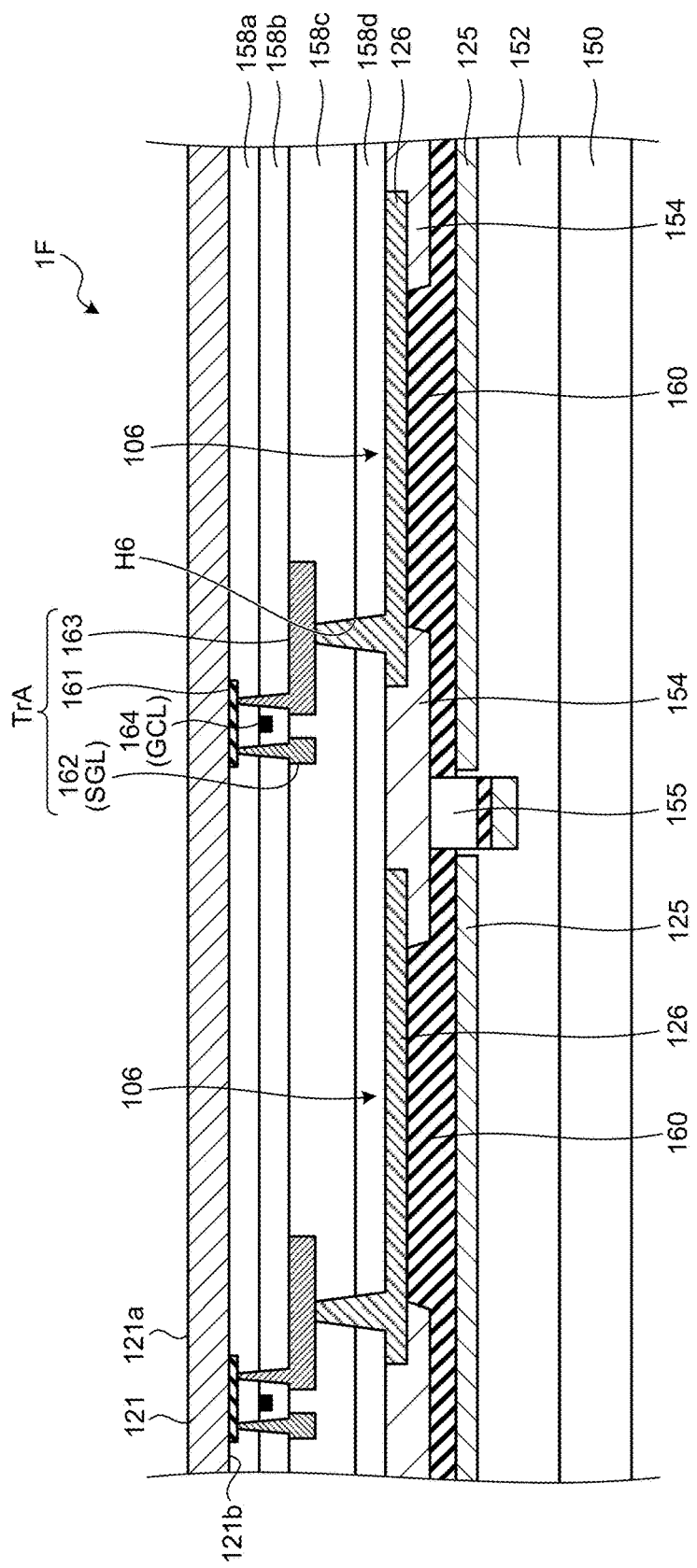
FIG. 29 is a sectional view of a schematic sectional structure of the display apparatus according to a seventh embodiment of the present invention.

FIG. 29 is a sectional view of a schematic sectional structure of the display apparatus according to a seventh embodiment of the present invention. In a display apparatus 1F according to the present embodiment, the display panel 20 (refer to FIG. 1) is an organic EL display panel. The display apparatus 1F includes a basement 121, switching elements TrA, and organic light-emitting diodes (OLEDs) 106.

The basement 121 has a first surface 121a and a second surface 121b opposite to the first surface 121a. The first surface 121a of the basement 121 according to the present embodiment serves as a display surface on which an image is displayed and as a detection surface on which an external object, such as a finger, in contact with or in proximity to the display apparatus 1F is detected. The basement 121 may be made of a resin film, such as a polyimide film.

The switching elements TrA and the OLEDs 106 are disposed in this order from the second surface 121b of the basement 121. A plurality of switching elements TrA and a plurality of OLEDs 106 are provided to each pixel. Light emitted from the OLEDs 106 is output to the basement 121.

The switching elements TrA are provided on the second surface 121b of the basement 121. The switching elements TrA each include a semiconductor layer 161, a source electrode 162, a drain electrode 163, and a gate electrode 164. Similarly to the example described above, part of the source line SGL serves as the source electrode 162, and part of the gate line GCL serves as the gate electrode 164.

The semiconductor layer 161 is provided on the second surface 121b of the basement 121. The gate electrode 164 (gate line GCL) is provided on the lower side of the semiconductor layer 161 with an insulating layer 158a interposed therebetween. The source electrode 162 (source line SGL) and the drain electrode 163 are provided on the lower side of the gate electrode 164 (gate line GCL) with an insulating layer 158b interposed therebetween.

The OLED 106 is a light-emitting diode including a first electrode 125, a second electrode 126, and an organic layer 160. The OLED 106 is provided on the lower side of the switching element TrA, that is, at the position farther from the second surface 121b of the basement 121 than the switching element TrA.

The second electrode 126 is provided on the lower side of the source electrode 162 (source line SGL) and the drain electrode 163 with a planarization layer 158c and an insulating layer 158d interposed therebetween. The second electrode 126 is electrically coupled to the drain electrode 163 through a contact hole H6. The first electrode 125 is provided on the lower side of the second electrode 126 in a manner facing the second electrode 126. The organic layer 160 is provided between the first electrode 125 and the second electrode 126.

The organic layer 160 includes a hole transport layer, a luminous layer, and an electronic transport layer. The first electrode 125 serves as a cathode and is made of a metal material, such as Al. The second electrode 126 serves as an anode and is made of a translucent conductive material, such as ITO. The first electrode 125 supplies a common voltage to a plurality of pixels. The second electrode 126 is supplied with an electric current based on video signals via the switching element TrA. Voltage signals applied between the first electrode 125 and the second electrode 126 controls light emission from the OLED 106.

The OLEDs 106 corresponding to the respective sub-pixels according to the present embodiment output light of the colors of RGB, thereby displaying an image. Alternatively, the OLEDs 106 may output light of a single color, such as white. In this case, the display apparatus 1F includes a color filter. With this configuration, the light output from the OLEDs 106 passes through the color filter, thereby performing color display.

The OLEDs 106 are provided to the respective sub-pixels, and a first rib (first protrusion) 154 and a second rib (second protrusion) 155 are provided at the boundaries between the sub-pixels. The first rib 154 and the second rib 155 are insulating layers made of an acrylic resin, for example. The first rib 154 provides electrical insulation between the second electrodes 126 provided to the respective sub-pixels. The second rib 155 provides electrical insulation between the first electrodes 125. The first electrodes 125 do not necessarily provided to the respective sub-pixels and may be separated and provided to predetermined areas each including a plurality of sub-pixels by the second ribs 155.

The present embodiment includes a barrier layer 152 and a packed layer 150 on the lower side of the OLEDs 106. The barrier layer 152 is provided in a manner covering the OLEDs 106. The barrier layer 152 suppresses transmission of water or the like included in the packed layer 150, thereby protecting the OLEDs 106.

In the display apparatus 1F according to the present embodiment, the first electrodes 125 serve as the drive electrodes in a detection operation, and the source lines SGL serve as the detection electrodes. In other words, the first electrode driver 14 supplies the detection drive signals Vs to the first electrodes 125. The source lines SGL output, to the detection controller 16, the detection signals Vdet based on a change in the capacitance between the first electrodes 125 and the source lines SGL. The display apparatus 1F thus can detect an external object in contact with or in proximity to the first surface 121a of the basement 121.

In the display apparatus 1F according to the present embodiment, the first electrodes 125 are separated and provided to the predetermined areas by the second ribs 155 and serve as the drive electrodes in a detection operation. The source lines SGL serve as the detection electrodes in the detection operation. This configuration does not require drive electrodes or detection electrodes of the detection device 30 in another layer or on another basement, thereby making the display apparatus 1F thinner.

While the first electrodes 125 serve as the drive electrodes, and the source lines SGL serve as the detection electrodes in the example above, the configuration is not limited thereto. The first electrodes 125 may serve as the drive electrodes, and the gate lines GCL may serve as the detection electrodes, for example. Alternatively, one of the gate lines GCL and the source lines SGL may serve as the drive electrodes, and the other thereof may serve as the detection electrodes.

While exemplary embodiments according to the present invention have been described, the embodiments are not intended to limit the invention. The contents disclosed in the embodiments are given by way of example only, and various changes may be made without departing from the spirit of the invention. Appropriate changes made without departing from the spirit of the invention naturally fall within the scope of the invention. At least one of various omissions, substitutions, and changes of the components may be made without departing from the spirit of the embodiments above and modifications thereof.

The display apparatus according to the present disclosure may have the following aspects, for example.

The display apparatus according to the present disclosure may further have the following aspects.

(1) A display apparatus comprising:

a basement having a first surface and a second surface opposite to the first surface;

a display functional layer arranged on a side of the second surface of the basement;

a first electrode that is arranged between the basement and the display functional layer and detects an object in contact with or in proximity to the first surface;

a guard electrode arranged between the first electrode and the basement and supplied with a guard signal, the guard signal suppressing a change in capacitance generated between the first electrode and the guard electrode; and a detection controller to which a signal based on a change in capacitance of the first electrode is output from the first electrode.

(2) The display apparatus according to (1), further comprising:

a second electrode facing the first electrode;

a switching element provided in correspondence with the second electrode;

a gate line that supplies a scanning signal to the switching element; and a source line that supplies a pixel signal to the second electrode via the switching element, wherein at least one of the gate line and the source line is the guard electrode.

(3) The display apparatus according to (2), wherein the gate line, the source line, the first electrode, and the second electrode are disposed in order from the basement to the display functional layer.

(4) The display apparatus according to (2), further comprising:

a coupling wire provided to a layer different from a layer of the first electrode and electrically coupled to the first electrode, wherein the signal is output to the detection controller via the coupling wire.

(5) The display apparatus according to (4), wherein the coupling wire is provided at a position overlapping with the gate line or the source line.

(6) The display apparatus according to (1), wherein: the display apparatus comprises a plurality of the first electrodes, and the plurality of the first electrodes are arrayed in a matrix in a display area of the basement.

(7) A display apparatus comprising:

a basement having a first surface and a second surface opposite to the first surface;

a display functional layer arranged on a side of the second surface of the basement;

a first electrode arranged between the basement and the display functional layer;

a second electrode facing the first electrode;

a switching element provided in correspondence with the second electrode, and arranged between the first electrode and the basement;

a detection electrode that is arranged between the first electrode and the basement and outputs a signal based on a change in capacitance formed between the first electrode and the detection electrode; and a detection controller to which the signal is output from the detection electrode.

(8) The display apparatus according to (7), further comprising:

a gate line that supplies a scanning signal to the switching element; and a source line that supplies a pixel signal to the second electrode via the switching element.

(9) The display apparatus according to (8), wherein the source line is the detection electrode.

(10) The display apparatus according to (9), wherein the display apparatus comprises a plurality of the source lines, and the display apparatus further comprises a coupling switcher that couples at least a target line of the source lines to the detection controller and sets at least a non-target line of the source lines into a floating state where an electric potential is not fixed.

(11) The display apparatus according to (8), wherein the gate line is the detection electrode.

(12) The display apparatus according to (11), wherein the display apparatus comprises a plurality of the gate lines, and the display apparatus further comprises a coupling switcher that couples at least a target line of the gate lines to the detection controller and sets at least a non-target line of the gate lines into a floating state where an electric potential is not fixed.

(13) The display apparatus according to (8), further comprising:

a light-shielding layer arranged between the switching element and the basement in a manner overlapping with the gate line or the source line and, the light-shielding layer having light transmittance lower than light transmittance of the basement, wherein the light-shielding layer is the detection electrode.

(14) The display apparatus according to (7), wherein the display apparatus comprises a plurality of the second electrodes, the plurality of the second electrodes are arrayed in a first direction and a second direction intersecting with the first direction in correspondence with pixels, the first electrode extends in the first direction, the display apparatus comprises a plurality of the first electrodes, the plurality of the first electrodes are arrayed in the second direction, and an array pitch of the plurality of the first electrodes is equal to an array pitch of the second electrodes in the second direction.

(15) The display apparatus according to (7), further comprising a third electrode to detect unevenness on a surface of an object in contact with or in proximity to the first surface, wherein the third electrode is arranged between the first electrode and the basement in a manner overlapping with the second electrode.

(16) A display apparatus comprising:

a basement having a first surface and a second surface opposite to the first surface;

a display functional layer arranged on a side of the second surface of the basement;

a first electrode that is arranged between the basement and the display functional layer and detects an object in contact with or in proximity to the first surface;

a guard electrode arranged between the first electrode and the basement and supplied with a guard signal, the guard signal suppressing a change in capacitance generated between the first electrode and the guard electrode;

a second electrode facing the first electrode; and a switching element provided in correspondence with the second electrode, wherein the first electrode is one of a plurality of first electrodes, and the first electrodes are arrayed in a matrix in a display area of the basement in planar view, and the switching element, the first electrodes, and the second electrode are disposed in order from the basement to the display functional layer.

(17) A display apparatus comprising:

a basement having a first surface and a second surface opposite to the first surface;

a display functional layer arranged on a side of the second surface of the basement;

a first electrode arranged between the basement and the display functional layer;

a second electrode facing the first electrode;

a switching element provided in correspondence with the second electrode; and a source line and a gate line coupled to the switching element, wherein the first electrode extends in a first direction in planar view and is one of a plurality of first electrodes, and the first electrodes are arrayed in a second direction intersecting with the first direction, at least one of the source line and the gate line intersects with the first electrodes in planar view, and the gate line, the source line, the first electrodes, and the second electrode are disposed in order from the basement to the display functional layer.

(18) A display apparatus comprising:

a basement having a first surface and a second surface opposite to the first surface;

a display functional layer arranged on a side of the second surface of the basement;

a first electrode arranged between the basement and the display functional layer;

a second electrode facing the first electrode;

a switching element provided in correspondence with the second electrode between the first electrode and the basement; and a detection electrode that is arranged between the switching element and the basement in a manner overlapping with a gate line coupled to the switching element, has light transmittance lower than light transmittance of the basement, and outputs a signal based on a change in capacitance generated between the first electrode and the detection electrode.

(19) A display apparatus comprising:

a basement having a first surface and a second surface opposite to the first surface;

a display functional layer arranged on a side of the second surface of the basement;

a first electrode arranged between the basement and the display functional layer;

a second electrode facing the first electrode;

a third electrode that is arranged between the first electrode and the basement in a manner overlapping with the second electrode and detects unevenness on a surface of an object in contact with or in proximity to the first surface; and a switching element provided in correspondence with the second electrode, and arranged between the first electrode and the basement, wherein the third electrode, the first electrode, and the second electrode are disposed in order from the basement to the display functional layer.

(20) A display apparatus comprising:

a basement having a first surface and a second surface opposite to the first surface;

a display functional layer arranged on a side of the second surface of the basement;

a first electrode arranged between the basement and the display functional layer;

a second electrode facing the first electrode;

a switching element provided in correspondence with the second electrode; and a source line and a gate line coupled to the switching element, wherein the first electrode extends in a first direction in planar view and is one of a plurality of first electrodes, and the first electrodes are arrayed in a second direction intersecting with the first direction at an array pitch equal to an array pitch of the second electrode, at least one of the source line and the gate line intersects with the first electrodes in planar view, and the gate line, the source line, the first electrodes, and the second electrode are disposed in order from the basement to the display functional layer.

(21) A display apparatus comprising:
a basement having a first surface and a second surface opposite to the first surface;
a first electrode;
a second electrode facing the first electrode;
a switching element provided in correspondence with the second electrode, and arranged between the first electrode and the basement;
a display functional layer arranged between the first electrode and the second electrode in a direction perpendicular to the second surface of the basement and provided with a plurality of pixels that display a predetermined color based on an amount of light from a light-emitting body; and
a detection electrode that is arranged between the first electrode and the basement and outputs a signal based on a change in capacitance generated between the first electrode and the detection electrode.

(22) The display apparatus according to (21), wherein the detection electrode, the second electrode, the display functional layer, and the first electrode are disposed in order from the basement.

What is claimed is:

1. A display apparatus comprising:
a basement having a first surface and a second surface opposite to the first surface;
a display functional layer arranged on a side of the second surface of the basement;
a first electrode that is arranged between the basement and the display functional layer and detects an object in contact with or in proximity to the first surface;
a second electrode facing the first electrode;
a guard electrode arranged between the first electrode and the basement and supplied with a guard signal, the guard signal suppressing a change in capacitance generated between the first electrode and the guard electrode; and
a detection controller to which a signal based on a change in capacitance of the first electrode is output from the first electrode,
wherein the first electrode and the second electrode are provided above the display functional layer.

2. The display apparatus according to claim 1, further comprising:
a switching element provided in correspondence with the second electrode;
a gate line that supplies a scanning signal to the switching element; and
a source line that supplies a pixel signal to the second electrode via the switching element, wherein
at least one of the gate line and the source line is the guard electrode.

3. The display apparatus according to claim 2, wherein the gate line, the source line, the first electrode, and the second electrode are disposed in order from the basement to the display functional layer.

4. The display apparatus according to claim 2, further comprising:
a coupling wire provided to a layer different from a layer of the first electrode and electrically coupled to the first electrode, wherein
the signal is output to the detection controller via the coupling wire.

5. The display apparatus according to claim 4, wherein the coupling wire is provided at a position overlapping with the gate line or the source line.

6. The display apparatus according to claim 1, wherein:
the display apparatus comprises a plurality of the first electrodes, and
the plurality of the first electrodes are arrayed in a matrix in a display area of the basement.

7. The display apparatus according to claim 1, wherein the first electrode drives the display functional layer.

8. A display apparatus comprising:
a basement having a first surface and a second surface opposite to the first surface;
a display functional layer arranged on a side of the second surface of the basement;
a first electrode arranged between the basement and the display functional layer;
a second electrode facing the first electrode;
a switching element provided in correspondence with the second electrode, and arranged between the first electrode and the basement;
a detection electrode that is arranged between the first electrode and the basement and outputs a signal based on a change in capacitance formed between the first electrode and the detection electrode; and
a detection controller to which the signal is output from the detection electrode,
wherein the first electrode and the second electrode are provided above the display functional layer.

9. The display apparatus according to claim 8, further comprising:
a gate line that supplies a scanning signal to the switching element; and
a source line that supplies a pixel signal to the second electrode via the switching element.

10. The display apparatus according to claim 9, wherein the source line is the detection electrode.

11. The display apparatus according to claim 10, wherein the display apparatus comprises a plurality of the source lines, and
the display apparatus further comprises a coupling switcher that couples at least a target line of the source lines to the detection controller and sets at least a non-target line of the source lines into a floating state where an electric potential is not fixed.

12. The display apparatus according to claim 9, wherein the gate line is the detection electrode.

13. The display apparatus according to claim 12, wherein the display apparatus comprises a plurality of the gate lines, and
the display apparatus further comprises a coupling switcher that couples at least a target line of the gate lines to the detection controller and sets at least a non-target line of the gate lines into a floating state where an electric potential is not fixed.

14. The display apparatus according to claim 9, further comprising:
a light-shielding layer arranged between the switching element and the basement in a manner overlapping with the gate line or the source line and, the light-shielding layer having light transmittance lower than light transmittance of the basement, wherein
the light-shielding layer is the detection electrode.

15. The display apparatus according to claim 8, wherein the display apparatus comprises a plurality of the second electrodes,
the plurality of the second electrodes are arrayed in a first direction and a second direction intersecting with the first direction in correspondence with pixels,
the first electrode extends in the first direction, the display apparatus comprises a plurality of the first electrodes, the plurality of the first electrodes are arrayed in the second direction, and an array pitch of the plurality of the first electrodes is equal to an array pitch of the second electrodes in the second direction.

16. The display apparatus according to claim 8, further comprising a third electrode to detect unevenness on a surface of an object in contact with or in proximity to the first surface, wherein the third electrode is arranged between the first electrode and the basement in a manner overlapping with the second electrode.

17. The display apparatus according to claim 8, wherein the first electrode drives the display functional layer.

* * * * *